US 6,739,616 B2

(12) United States Patent
Lin

(10) Patent No.: US 6,739,616 B2
(45) Date of Patent: May 25, 2004

(54) FOLDABLE THREE-WHEEL BABY CARRIAGE WITH A SHOCK-ABSORBING FUNCTION

(76) Inventor: Wan-Hsing Lin, 58, Ma Yuan West St., Taichung (TW)

(*) Notice: Subject to any disclaimer, the term of this patent is extended or adjusted under 35 U.S.C. 154(b) by 55 days.

(21) Appl. No.: 10/273,761

(22) Filed: Oct. 16, 2002

(65) Prior Publication Data

US 2004/0075247 A1 Apr. 22, 2004

(51) Int. Cl.[7] .............................. B62B 1/00; B62B 7/00; B62B 9/08; B62D 61/06
(52) U.S. Cl. .................. 280/642; 280/647; 280/47.38; 280/62; 280/650; 188/20
(58) Field of Search ................................ 280/647, 642, 280/650, 655, 655.1, 641, 639, 47.38, 47.34, 657, 658, 38, 62, 47.371, 47.4, 704, 124.1, 87.01, 87.04; 188/20

(56) References Cited

U.S. PATENT DOCUMENTS

| | | | | | |
|---|---|---|---|---|---|
| 3,770,289 A | * | 11/1973 | Dougherty et al. | ......... | 280/639 |
| 4,527,665 A | * | 7/1985 | Shamie | ....................... | 188/200 |
| 5,351,364 A | * | 10/1994 | Zun | ........................... | 16/35 R |
| 5,581,843 A | * | 12/1996 | Purnell | ....................... | 16/35 R |
| 5,669,624 A | * | 9/1997 | Eichhorn | ..................... | 280/642 |
| 5,887,889 A | * | 3/1999 | Andrus | ........................ | 280/647 |
| 6,152,476 A | * | 11/2000 | Huang | ......................... | 280/642 |
| 6,219,845 B1 | * | 4/2001 | Ferriter | ............................. | 2/24 |
| 6,276,480 B1 | * | 8/2001 | Aregger | ..................... | 180/213 |
| 6,312,005 B1 | * | 11/2001 | Lin | ............................. | 280/647 |
| 6,663,122 B1 | * | 12/2003 | Lin | ............................. | 470/62 |

* cited by examiner

Primary Examiner—Brian L. Johnson
Assistant Examiner—Gerald B. Klebe

(57) ABSTRACT

A foldable three-wheel baby carriage includes an operation device mounted on the horizontal section of each of the two push bars, a front shock-absorbing device mounted between the front wheel and the two front frames, two rear connecting devices each mounted between a respective one of the two rear wheels and a respective one of the two rear frames, and two rear shock-absorbing devices each mounted between a respective one of the two rear wheels and a respective one of the two rear frames. Thus, the foldable three-wheel baby carriage may provide shock-absorbing and braking functions, thereby protecting the baby. In addition, the connecting devices and the operation device of the foldable three-wheel baby carriage are arranged in hidden manner, thereby enhancing the aesthetic quality of the foldable three-wheel baby carriage.

6 Claims, 20 Drawing Sheets

US 6,739,616 B2

FOLDABLE THREE-WHEEL BABY CARRIAGE WITH A SHOCK-ABSORBING FUNCTION

BACKGROUND OF THE INVENTION

1. Field of the Invention

The present invention relates to a foldable three-wheel baby carriage with a shock-absorbing function, and more particularly to a foldable three-wheel baby carriage that is provided with a front shock-absorbing device and two rear shock-absorbing devices, thereby providing a shock-absorbing function.

2. Description of the Related Art

A conventional three-wheel baby carriage is not provided with a shock-absorbing device, thereby lacking a shock-absorbing function. In addition, both of the frame and the wheels of the conventional three-wheel baby carriage have a fixed size, thereby limiting the versatility of the conventional three-wheel baby carriage. Further, the conventional three-wheel baby carriage is not provided with a brake. Further, the wheels of the conventional three-wheel baby carriage are fixed and cannot be detached conveniently, thereby causing inconvenience in maintenance and replacement.

SUMMARY OF THE INVENTION

The present invention has arisen to mitigate and/or obviate the disadvantage of the conventional baby carriage.

The primary objective of the present invention is to provide a foldable three-wheel baby carriage that is provided with a front shock-absorbing device and two rear shock-absorbing devices, thereby providing a shock-absorbing function.

Another objective of the present invention is to provide a foldable three-wheel baby carriage that is provided with a brake to provide a braking function, thereby protecting the baby.

A further objective of the present invention is to provide a foldable three-wheel baby carriage with a shock-absorbing function, wherein the connecting devices and the operation device of the foldable three-wheel baby carriage are arranged in hidden manner, thereby enhancing the aesthetic quality of the foldable three-wheel baby carriage, and thereby preventing injury of the baby.

A further objective of the present invention is to provide a foldable three-wheel baby carriage with a shock-absorbing function, wherein the length of each of the two vertical sections of the support rack of the front shock-absorbing device may be changed according to the size of the front wheel, thereby enhancing the versatility of the foldable three-wheel baby carriage.

A further objective of the present invention is to provide a foldable three-wheel baby carriage with a shock-absorbing function, wherein the locking block may be moved to detach the locking rib from the insertion groove of the wheel shaft of the respective rear wheel, so that the wheel shaft may be detached from the straddle rod easily and quickly, thereby facilitating detachment and replacement of the rear wheels.

Further benefits and advantages of the present invention will become apparent after a careful reading of the detailed description with appropriate reference to the accompanying drawings.

DETAILED DESCRIPTION OF THE INVENTION

Figure 1:
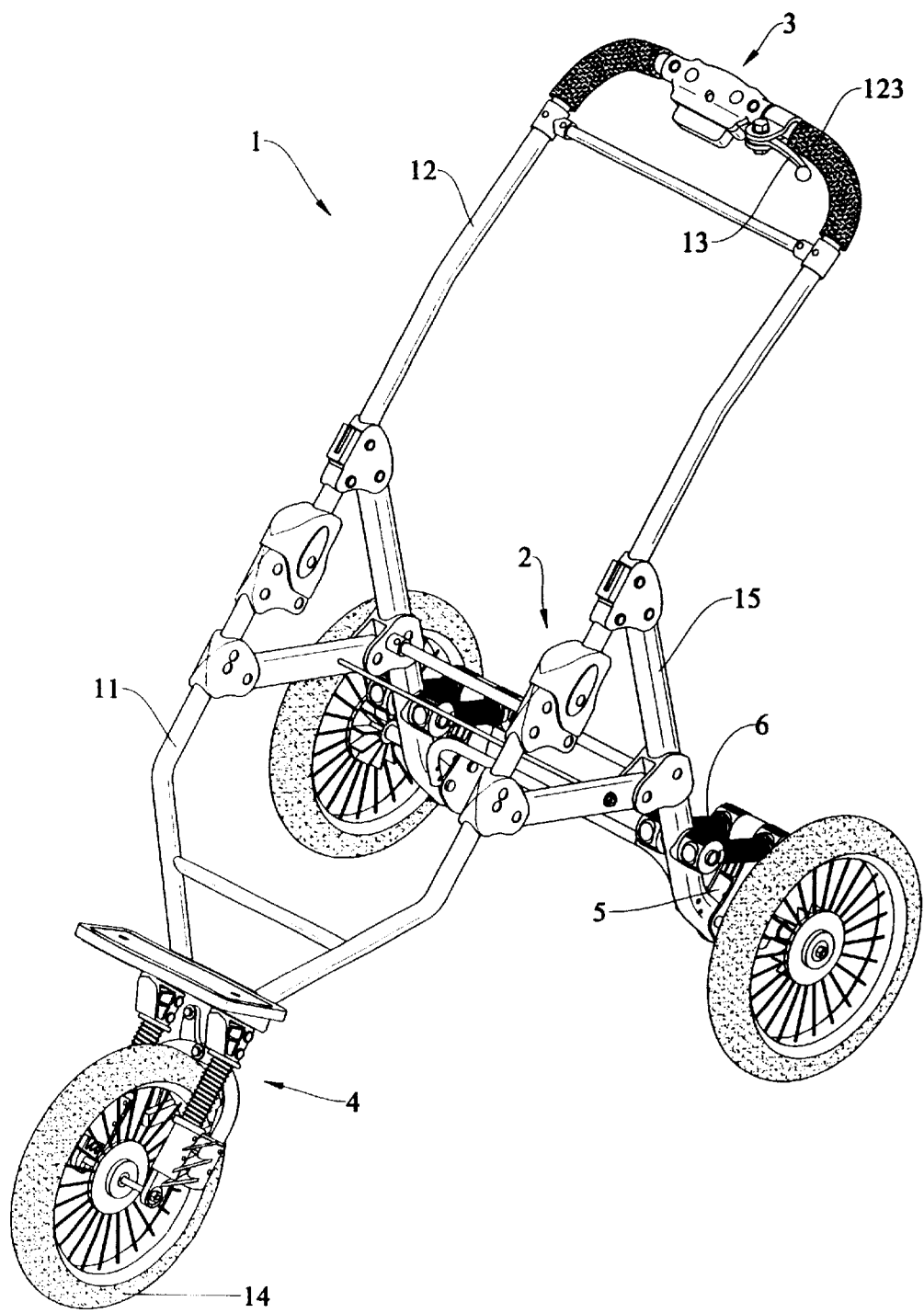
FIG. 1 is a perspective view of a foldable three-wheel baby carriage with a shock-absorbing function in accordance with a preferred embodiment of the present invention.
Figure 2:
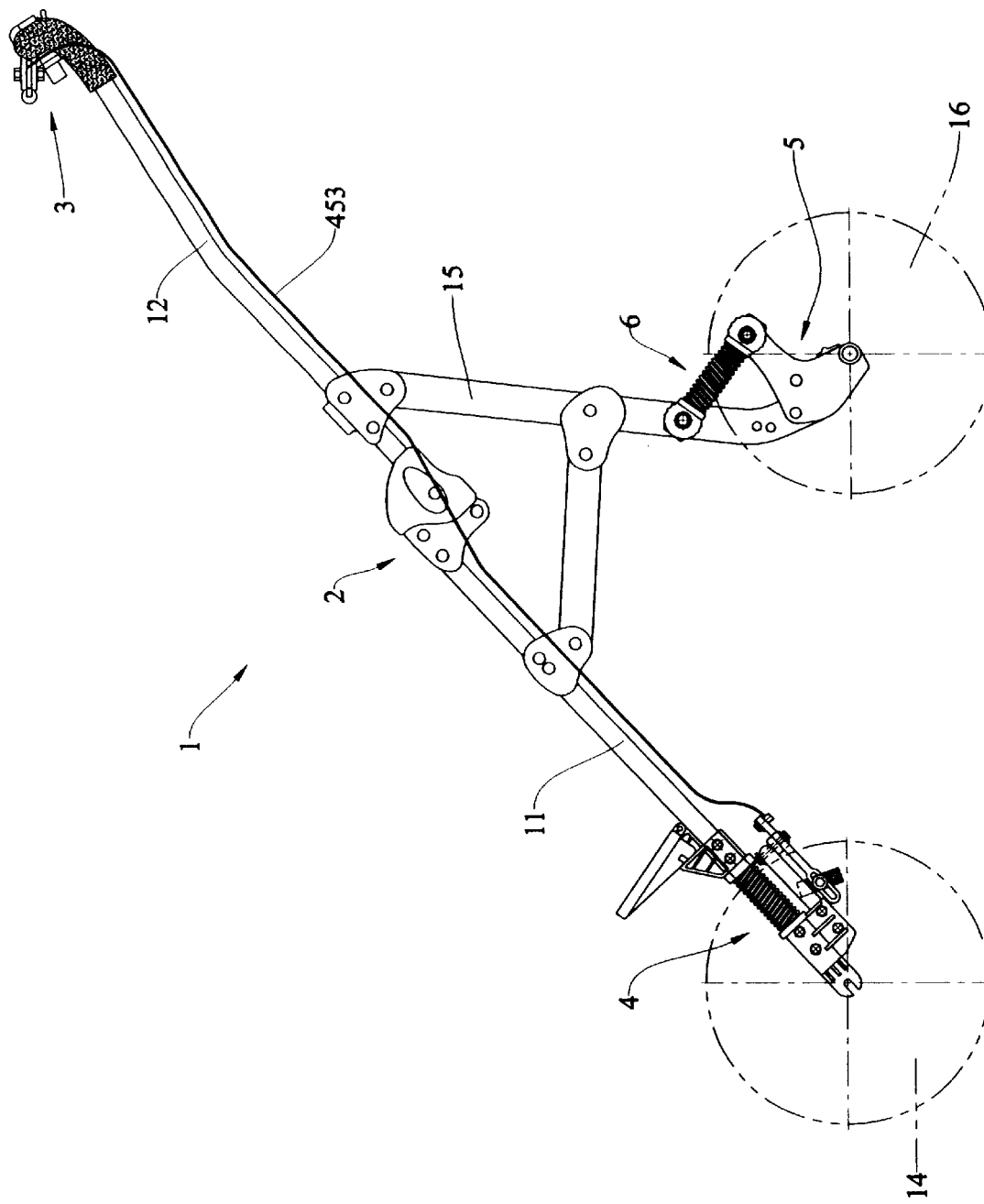
FIG. 2 is a side plan view of the foldable three-wheel baby carriage with a shock-absorbing function as shown in FIG. 1.

Referring to the drawings and initially to FIGS. 1 and 2, a foldable three-wheel baby carriage 1 with a shock-absorbing function in accordance with a preferred embodiment of the present invention comprises a front wheel 14, two front frames 11, two push bars 12 each having a bent upper end provided with a horizontal section 123, two rear wheels 16, two rear frames 15, two connecting devices 2 each mounted between a respective one of the two front frames 11 and a respective one of the two push bars 12, an operation device 3 mounted on the horizontal section 123 of each of the two push bars 12, a front shock-absorbing device 4 mounted between the front wheel 14 and the two front frames 11, two rear connecting devices 5 each mounted between a respective one of the two rear wheels 16 and a respective one of the two rear frames 15, and two rear shock-absorbing devices 6 each mounted between a respective one of the two rear wheels 16 and a respective one of the two rear frames 15.

Figure 3:
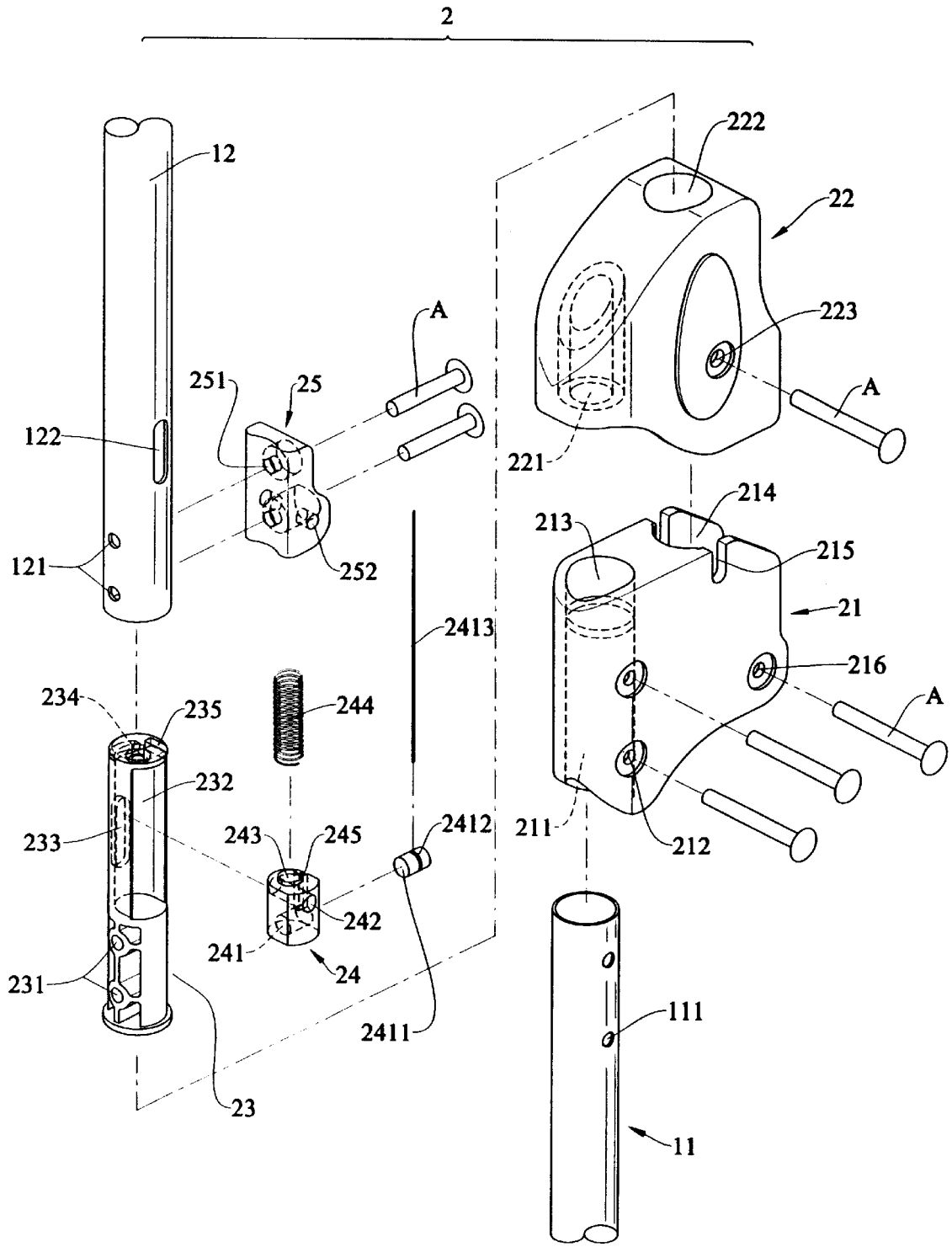
FIG. 3 is an exploded perspective view of a connecting device of the foldable three-wheel baby carriage with a shock-absorbing function in accordance with the preferred embodiment of the present invention.
Figure 4:
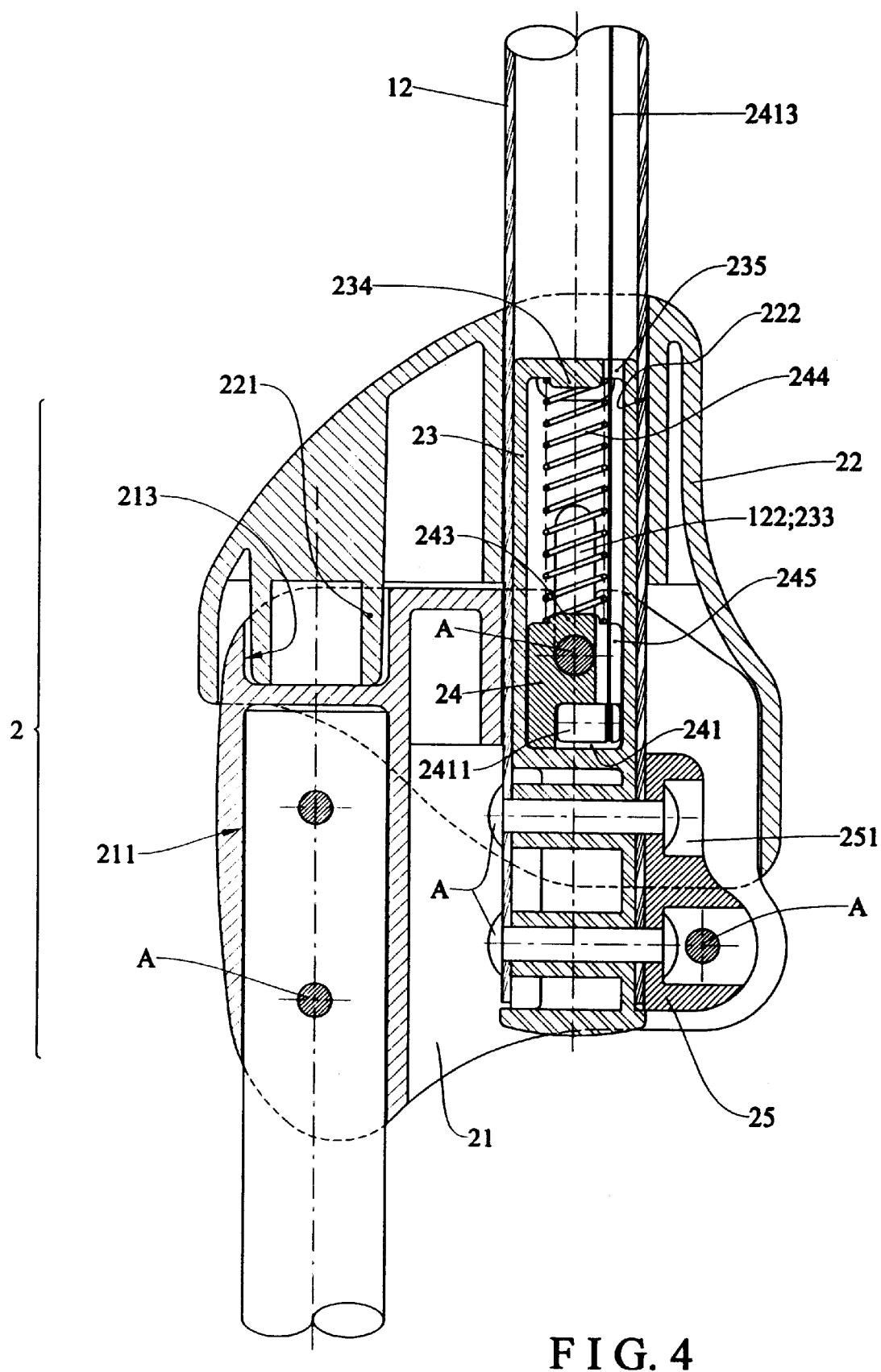
FIG. 4 is a side plan cross-sectional assembly view of the connecting device of the foldable three-wheel baby carriage with a shock-absorbing function as shown in FIG. 3.

Referring to FIGS. 1, 3 and 4, each of the two connecting devices 2 includes a front frame mounting seat 21, a push bar mounting seat 22, a mounting rod 23, a movable block 24, and a mounting rod fixing seat 25.

The front frame mounting seat 21 of each of the two connecting devices 2 has a front side formed with an insertion hole 211 for insertion of a respective one of the two front frames 11 and a cavity 213 located above the insertion hole 211. The insertion hole 211 of the front frame mounting seat 21 has a wall formed with two through holes 212 aligning with two through holes 111 of the respective front frame 11 for passage of two rivet members "A" which are extended through the two through holes 212 of the front frame mounting seat 21 and the two through holes 111 of the respective front frame 11, so that the front frame mounting seat 21 is fixed on the respective front frame 11. The front frame mounting seat 21 has a rear side formed with a receiving space 214 having two side walls each formed with an opening 215. The rear side of the front frame mounting seat 21 has a lower portion formed with a through hole 216 for passage of a rivet member "A".

The push bar mounting seat 22 of each of the two connecting devices 2 is mounted on the upper portion of the front frame mounting seat 21, and has a front side having an inner wall provided with an insertion post 221 inserted into the cavity 213 of the front frame mounting seat 21, and has a rear side formed with an insertion hole 222 aligning with the receiving space 214 of the front frame mounting seat 21 for insertion of a respective one of the two push bars 12. The rear side of the push bar mounting seat 22 has a lower portion formed with a through hole 223 for passage of a rivet member "A".

The mounting rod 23 of each of the two connecting devices 2 is mounted in the lower end of a respective one of the two push bars 12, and has a lower section formed with two through holes 231 aligning with two through holes 121 of the lower end of the respective push bar 12, and has an upper section formed with a window 232 having a rear wall formed with an oblong slot 233 aligning with an oblong slot 122 of the respective push bar 12. The mounting rod 23 of each of the two connecting devices 2 has a top having an inside protruded with a lug 234 for mounting a first end of an elastic member 244. The lug 234 of the mounting rod 23 has a side formed with a rectangular hole 235.

The movable block 24 of each of the two connecting devices 2 is mounted in the window 232 of the mounting rod 23, and has a lower section formed with a receiving hole 241 for receiving a plug 2411 which has a periphery formed with an annular groove 2412 for securing a first end of each of two pull cords 2413. The movable block 24 of each of the two connecting devices 2 has an upper section formed with a through hole 242 and has a top protruded with a lug 243 for mounting a second end of the elastic member 244. The lug 243 of the movable block 24 has a side formed with a recess 245 communicating with the through hole 242 of the movable block 24.

The fixing seat 25 of each of the two connecting devices 2 is rested on the lower end of a respective one of the two push bars 12, and has a lower section formed with two through holes 251 aligning with the two through holes 121 of the lower end of the respective push bar 12 and the two through holes 231 of the mounting rod 23 for passage of the two rivet members "A". The fixing seat 25 of each of the two connecting devices 2 has a lower end formed with a through hole 252.

Figure 5:
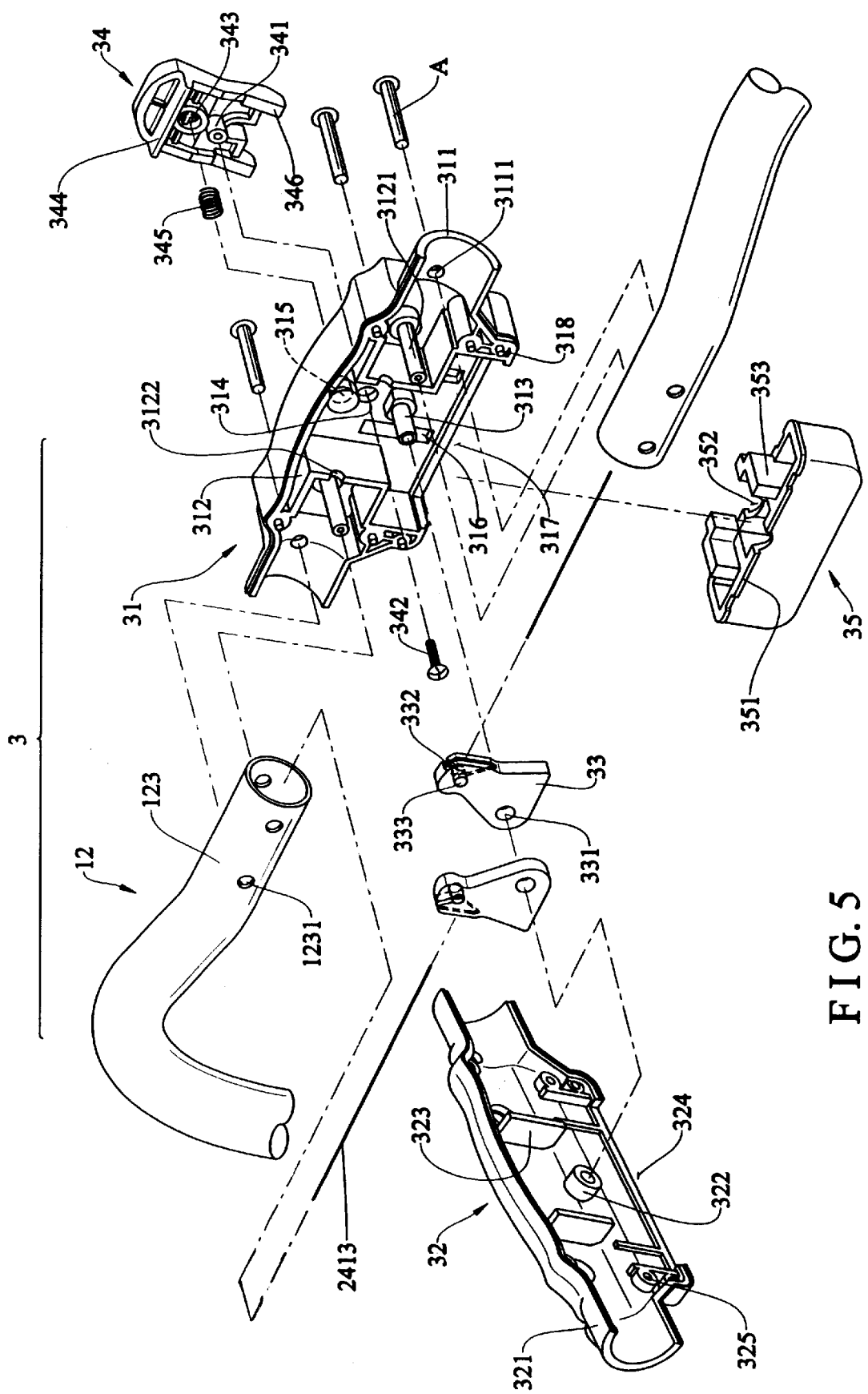
FIG. 5 is an exploded perspective view of an operation device of the foldable three-wheel baby carriage with a shock-absorbing function in accordance with the preferred embodiment of the present invention.
Figure 6:
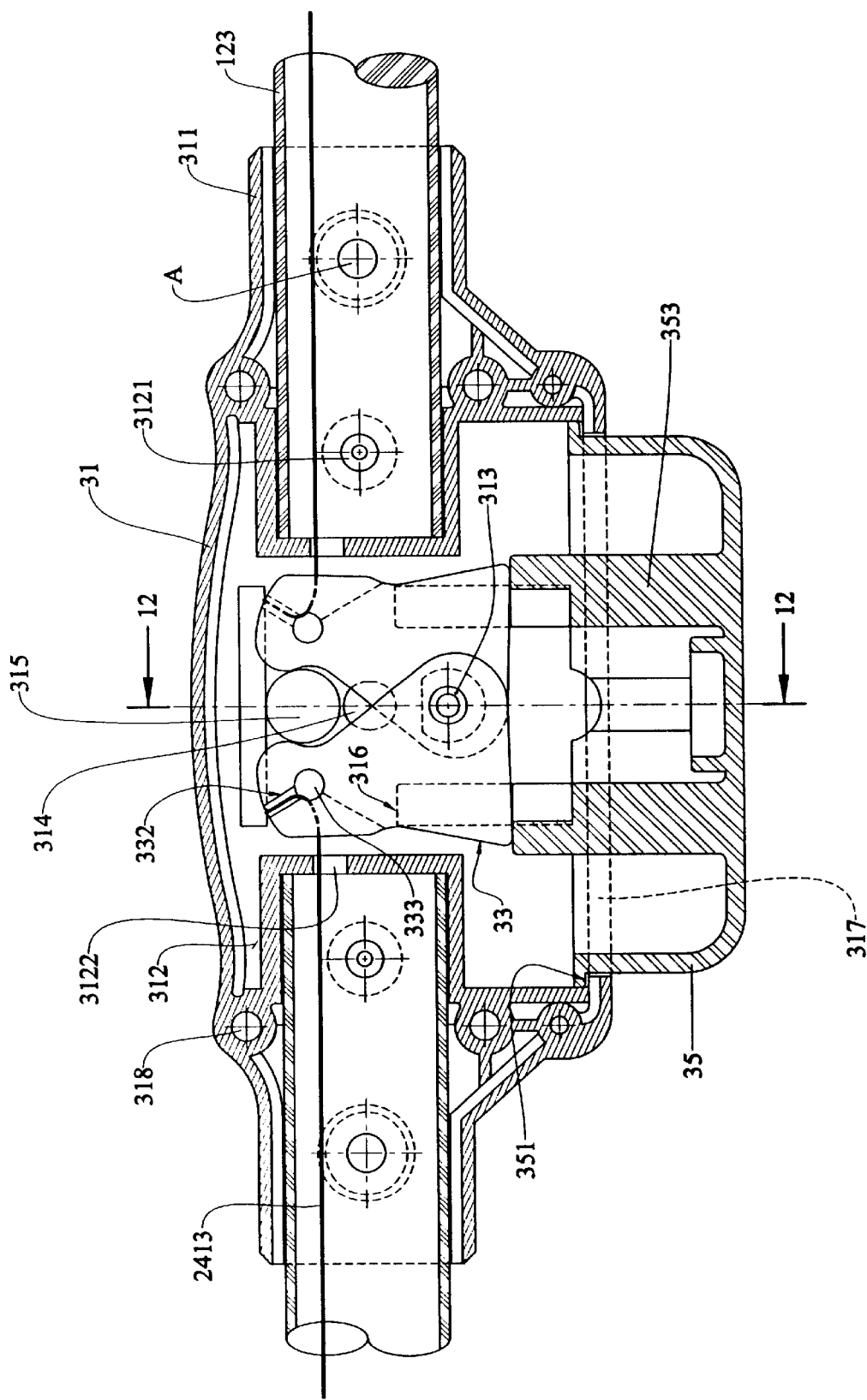
FIG. 6 is a side plan cross-sectional assembly view of the operation device of the foldable three-wheel baby carriage with a shock-absorbing function as shown in FIG. 5.
Figure 7:
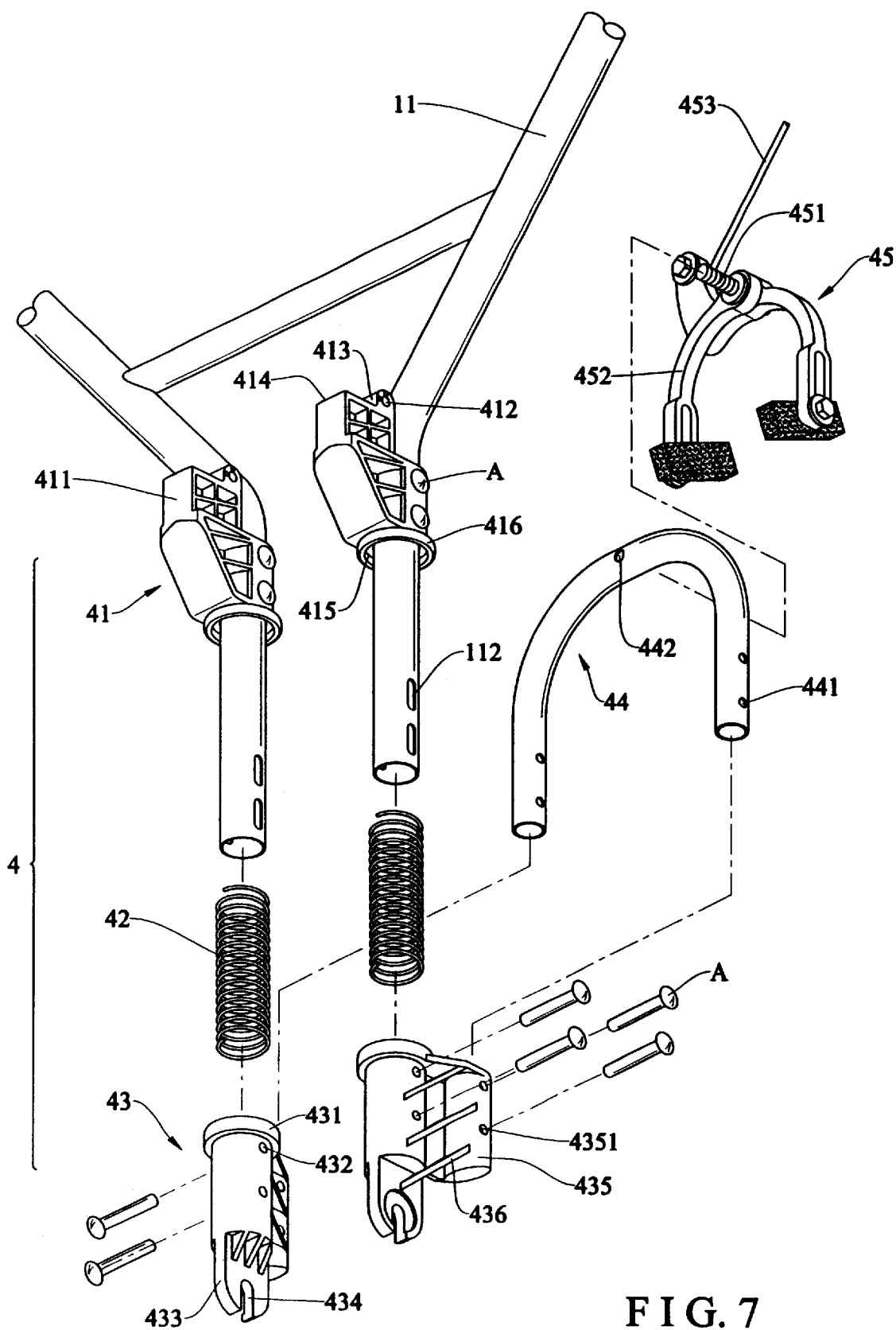
FIG. 7 is an exploded perspective view of a front shock-absorbing device of the foldable three-wheel baby carriage with a shock-absorbing function in accordance with the preferred embodiment of the present invention.

Referring to FIGS. 1, 5 and 6, the operation device 3 includes a lower cover 31, an upper cover 32, two driving plates 33, a lower press board 34, and a pull block 35.

The lower cover 31 of the operation device 3 has two ends each provided with a semi-circular support plate 311 and a partition 312 for mounting the horizontal section 123 of a respective one of the two push bars 12. The semi-circular support plate 311 is formed with a circular hole 3111 aligning with one of two through holes 1231 of the horizontal section 123 of the respective push bar 12, and the partition 312 is provided with a longer post 3121 inserted into the other one of the two through holes 1231 of the horizontal section 123 of the respective push bar 12. The partition 312 has an end face formed with a semi-circular hole 3122. The lower cover 31 of the operation device 3 has a mediate portion provided with a shorter post 313 and formed with a mounting hole 314 and a receiving chamber 315 having an opening facing downward. The mediate portion of the lower cover 31 of the operation device 3 is formed with two rectangular slots 316 with the shorter post 313 being located between the two rectangular slots 316. The lower cover 31 of the operation device 3 has a front side formed with a gate 317 and having a periphery provided with a plurality of bosses 318.

The upper cover 32 of the operation device 3 is mounted on the lower cover 31, and has two ends each provided with a semi-circular support plate 321. The upper cover 32 of the operation device 3 has a mediate portion provided with a recessed mounting stud 322 for insertion of the shorter post 313 of the lower cover 31. The mediate portion of the upper cover 32 of the operation device 3 is provided with two limit plates 323 with the mounting stud 322 being located between the two limit plates 323. The upper cover 32 of the operation device 3 has a front side formed with a gate 324 and having a periphery provided with a plurality of positioning holes 325 for positioning the bosses 318 of the lower cover 31.

Each of the two driving plates 33 of the operation device 3 has a sector shape and is pivotally mounted in the lower cover 31. Each of the two driving plates 33 of the operation device 3 has a first portion formed with a through hole 331 for passage of the shorter post 313 of the lower cover 31 and a second portion formed with a through hole 333 and a groove 332 communicating with the through hole 333 of the second portion for securing a second end of each of the two pull cords 2413.

The lower press board 34 of the operation device 3 is mounted on a lower portion of the lower cover 31, and has a center provided with a threaded post 341 passed through the mounting hole 314 of the lower cover 31 and screwed and fixed by a threaded rod 342. The lower press board 34 of the operation device 3 is formed with a recess 343 located beside the threaded post 341 for mounting an elastic member 345 which is urged on the receiving chamber 315 of the lower cover 31. The lower press board 34 of the operation device 3 is provided with an upright plate 344 located beside the recess 343. The lower press board 34 of the operation device 3 has a front side provided with two spaced catch plates 346.

The pull block 35 of the operation device 3 is mounted in the gate 317 of the lower cover 31 and the gate 324 of the lower cover 32, and has a periphery formed with a catch edge 252 and two opposite semi-circular recesses 352. The pull block 35 of the operation device 3 is provided with two push blocks 353.

Referring to FIGS. 1, 7, 8 and 13, the front shock-absorbing device 4 is mounted between the front wheel 14 and the two front frames 11, and includes two upper seats 41, two shaft seats 43, two elastic members 42, a support rack 44, and a caliper brake 45.

Each of the two upper seats 41 of the front shock-absorbing device 4 is secured on the lower end of a respective one of the two front frames 11 by rivet members "A". Each of the two upper seats 41 of the front shock-absorbing device 4 has an upper end provided with a support block 411 and a lower end provided with a ring 416 formed with a concave portion 415. The support block 411 of each of the two upper seats 41 of the front shock-absorbing device 4 has a top provided with a lug 413 formed with a through hole 412 and provided with a concave face 414.

Figure 8:
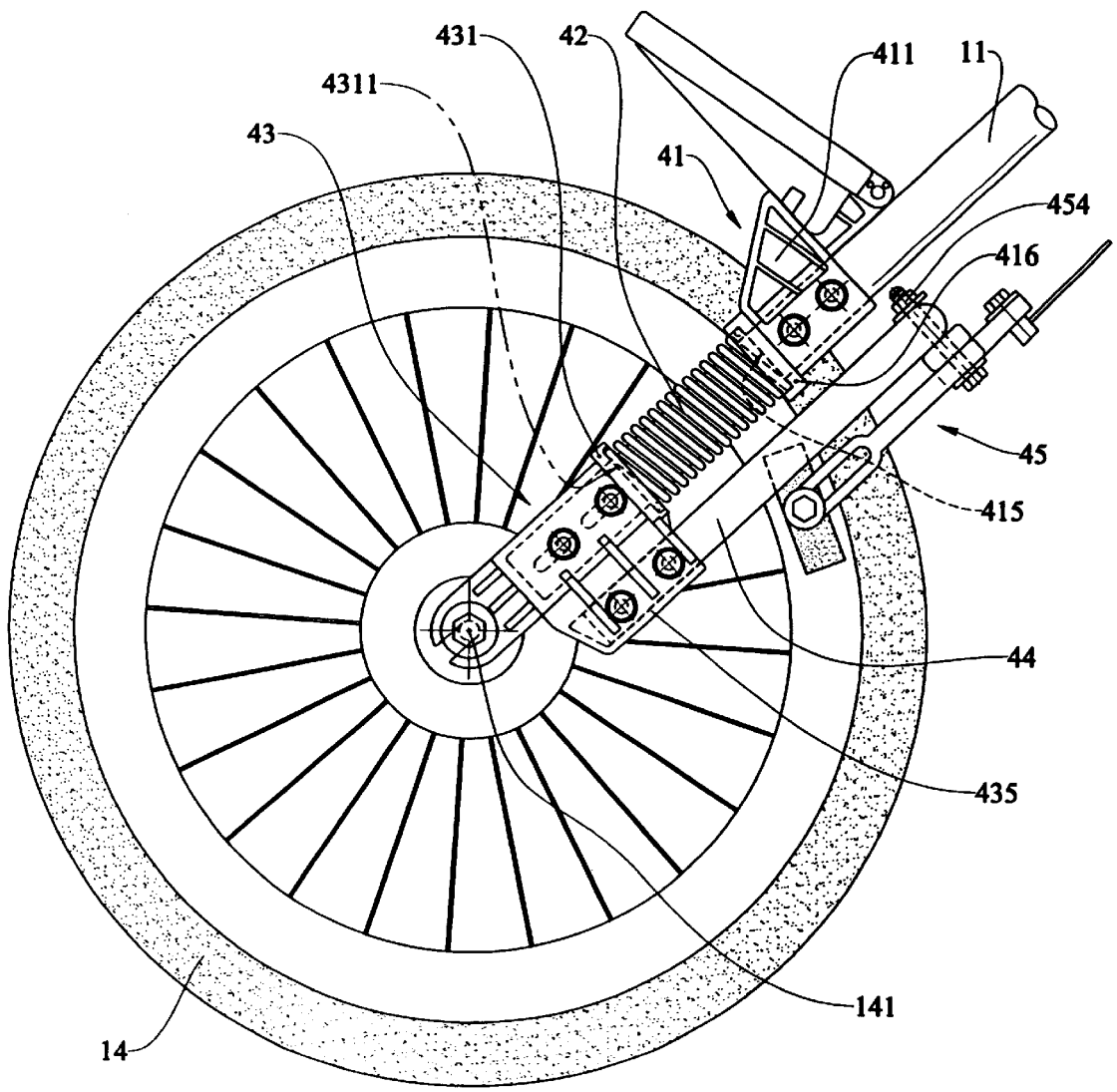
FIG. 8 is a side plan cross-sectional assembly view of the front shock-absorbing device of the foldable three-wheel baby carriage with a shock-absorbing function as shown in FIG. 7.
Figure 9:
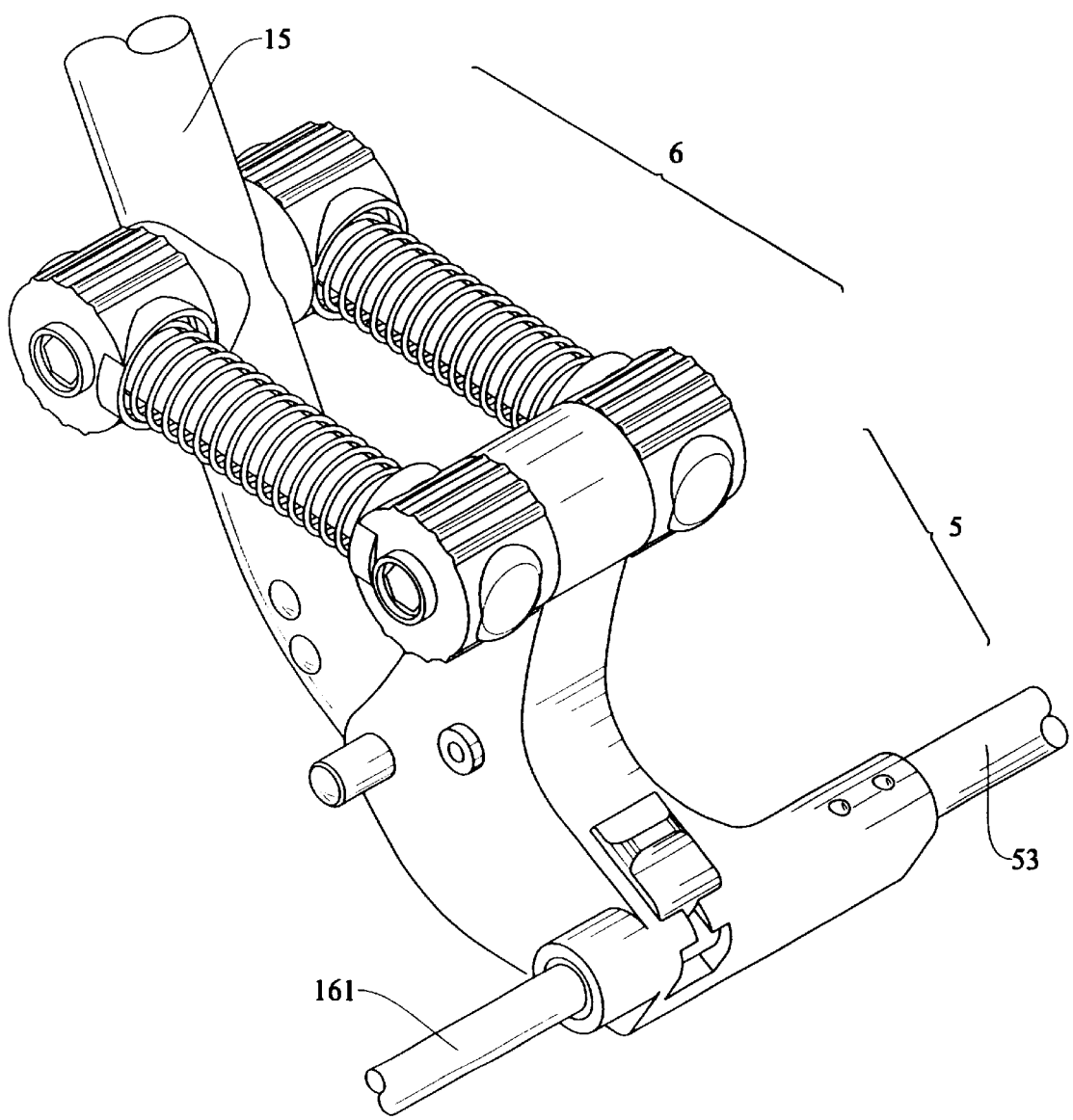
FIG. 9 is a perspective view of a rear shock-absorbing device of the foldable three-wheel baby carriage with a shock-absorbing function in accordance with the preferred embodiment of the present invention.
Figure 10:
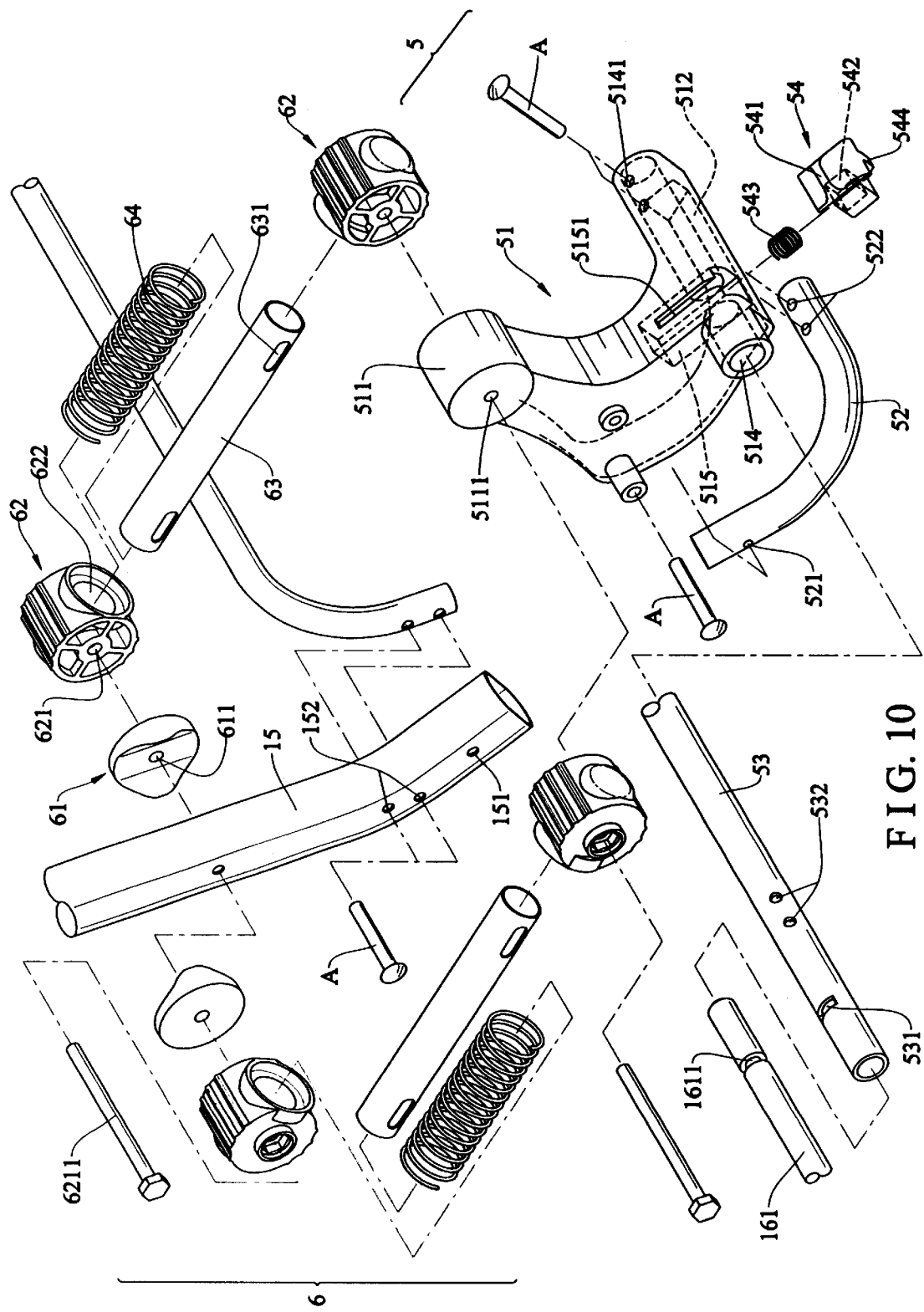
FIG. 10 is an exploded perspective view of the rear shock-absorbing device of the foldable three-wheel baby carriage with a shock-absorbing function as shown in FIG. 9.
Figure 11:
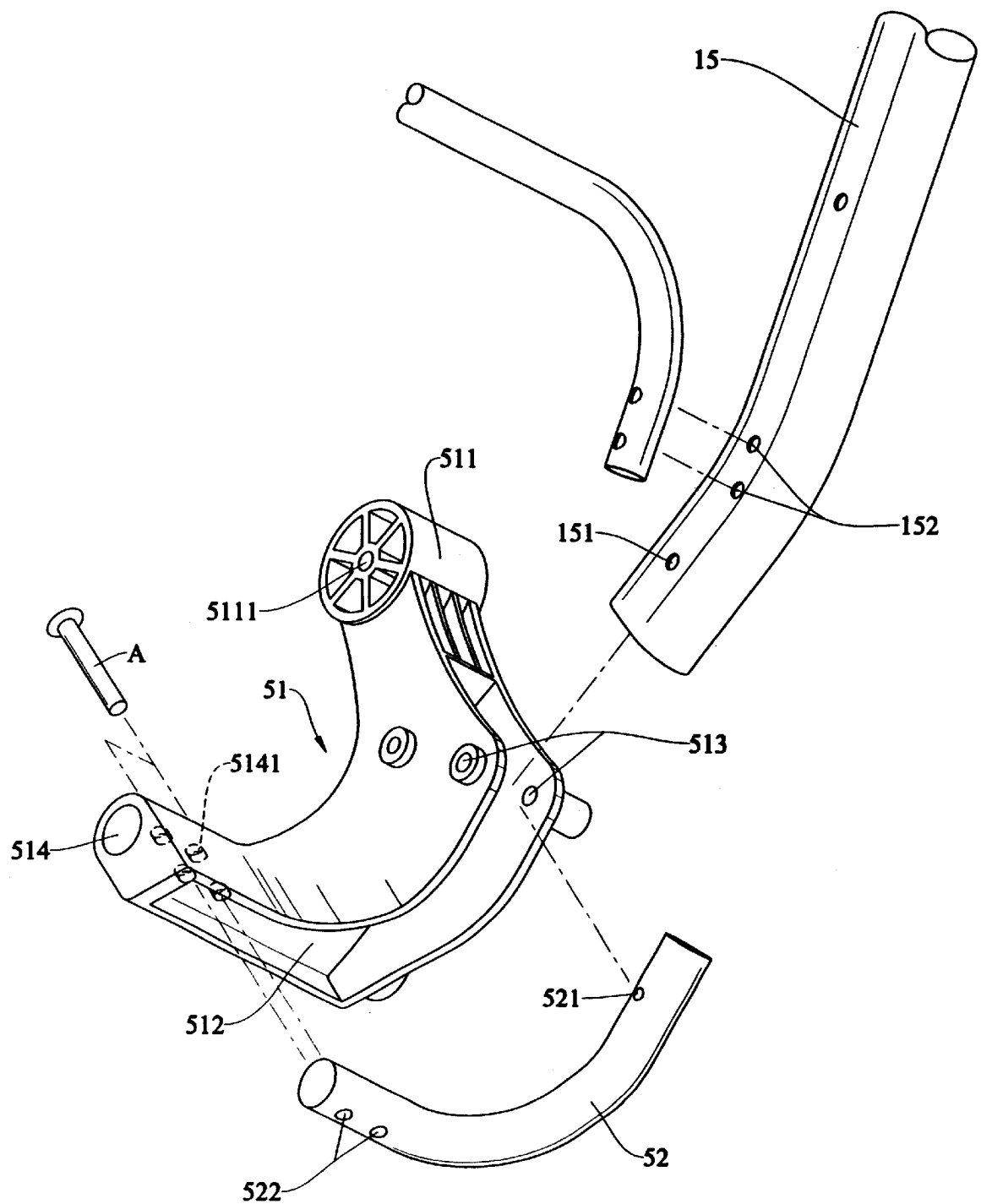
FIG. 11 is a partially exploded perspective view of the rear shock-absorbing device of the foldable three-wheel baby carriage with a shock-absorbing function as shown in FIG. 9.

Each of the two shaft seats 43 of the front shock-absorbing device 4 is mounted on the lower end of a respective one of the two front frames 11, and has a top face provided with a ring 431 formed with a concave portion 4311 (see FIG. 8). Each of the two shaft seats 43 of the front shock-absorbing device 4 has a wall formed with two through holes 432 aligning with two oblong slots 112 of the lower end each of the two front frames 11 for passage of two rivet members "A". Each of the two shaft seats 43 of the front shock-absorbing device 4 has a lower end provided with a support plate 433 formed with an elongated opening 434 facing downward for mounting the wheel shaft 141 of the front wheel 14 (see FIG. 8). Each of the two shaft seats 43 of the front shock-absorbing device 4 has a rear side integrally formed with a hollow sleeve 435 having a wall formed with two through holes 4351. A plurality of reinforcing ribs 436 are mounted between the shaft seat 43 and the hollow sleeve 435.

Each of the two elastic members 42 of the front shock-absorbing device 4 is mounted on the lower end of a respective one of the two front frames 11, and has an upper end mounted in the concave portion 415 of the ring 416 of the upper seat 41 and a lower end mounted in the concave portion 4311 of the ring 431 of the shaft seat 43.

The support rack 44 of the front shock-absorbing device 4 is substantially inverted U-shaped, and has two vertical sections each mounted in the hollow sleeve 435 of each of the two shaft seats 43 and each having a wall formed with two through holes 441 aligning with the two through holes 4351 of the hollow sleeve 435 for passage of two rivet members "A". The length, of each of the two vertical sections of the support rack 44 of the front shock-absorbing device 4 is changed according to the size of the front wheel 14. The support rack 44 of the front shock-absorbing device 4 has a horizontal section formed with a through hole 442.

The caliper brake 45 of the front shock-absorbing device 4 is mounted on the support rack 44 and is provided with a threaded rod 451 extended through the through hole 442 of the support rack 44 and screwed with a nut 454 (see FIG. 8). The caliper brake 45 of the front shock-absorbing device 4 is provided with two brake calipers 452, and a brake cable 453 having a lower end secured on one of the two brake calipers 452 and an upper end extended along the front frame 11 and the push bar 12 and secured on a brake lever 13 mounted on the horizontal section 123 of the push bar 12.

Referring to FIGS. 1, 9–11 and 15, each of the two rear connecting devices 5 is mounted between a respective one of the two rear wheels 16 and a respective one of the two rear frames 15, and includes a wheel seat 51, an elbow 52, a straddle rod 53, and a locking block 54.

The wheel seat 51 of each of the two rear connecting devices 5 is substantially saddle-shaped, and has a front end formed with a drum-shaped end portion 511 formed with a through hole 5111. The wheel seat 51 of each of the two rear connecting devices 5 has a bottom formed with a lower chamber 512 having two side walls each formed with a circular hole 513 aligning with a through hole 151 formed in the lower end of a respective one of the two rear frames 15 for passage of a rivet member "A", so that the wheel seat 51 of each of the two rear connecting devices 5 is secured on the lower end of the respective rear frame 15. The wheel seat 51 of each of the two rear connecting devices 5 has a rear end formed with a shaft hole 514 communicating with the lower chamber 512 and two circular holes 5141 each communicating with the shaft hole 514. The rear end of the wheel seat 51 of each of the two rear connecting devices 5 has a top face formed with a receiving chamber 515 communicating with the, shaft hole 514. The receiving chamber 515 has a top wall formed with an elongated groove 5151.

The elbow 52 of each of the two rear connecting devices 5 is substantially L-shaped, and is mounted in the lower chamber 512 of the wheel seat 51. The elbow 52 of each of the two rear connecting devices 5 has a front end received in the lower end of the respective rear frame 15 and formed with a through hole 521 aligning with the through hole 151 of the lower end of the respective rear frame 15 and the circular hole 513 of the wheel seat 51 for passage of the rivet member "A", so that the wheel seat 51 and the front end of the elbow 52 of each of the two rear connecting devices 5 are combined with the lower end of the respective rear frame 15 by the rivet member "A". The elbow 52 of each of the two rear connecting devices 5 has a rear end formed with two through holes 522 aligning with the two circular holes 5141 of the wheel seat 51.

The straddle rod 53 is extended through the shaft hole 514 of the wheel seat 51 of each of the two rear connecting devices 5, and has two ends each formed with two through holes 532 aligning with the two circular holes 5141 of the wheel seat 51 and aligning with the two through holes 522 of the elbow 52 of each of the two rear connecting devices 5 for passage of two rivet members "A", thereby combining the wheel seat 51, the elbow 52 and the straddle rod 53. Each of the two ends of the straddle rod 53 is formed with a cutout 531 aligning with the elongated groove 5151 of the wheel seat 51 of each of the two rear connecting devices 5 and aligning with an insertion groove 1611 of the wheel shaft 161 of a respective one of the two rear wheels 16.

The locking block 54 of each of the two rear connecting devices 5 has an upper portion provided with a driving plate 541 slidably mounted on the wheel seat 51 and a lower portion formed with a chamber 542 for receiving a first end of an elastic member 543 whose second end is received in the receiving chamber 515 of the wheel seat 51 of each of the two rear connecting devices 5. The lower portion of the locking block 54 of each of the two rear connecting devices 5 is provided with a locking rib 544 slidably mounted in the elongated groove 5151 of the wheel seat 51, extended through the cutout 531 of the straddle rod 53 and inserted into the insertion groove 1611 of the wheel shaft 161 of a respective one of the two rear wheels 16.

Again referring to FIGS. 1, 9–11 and 15, each of the two rear shock-absorbing devices 6 is mounted between the wheel seat 51 of a respective one of the two rear connecting devices 5 and a respective one of the two rear frames 15, and includes two pads 61, four knobs 62, two inner rods 63, and two elastic members 64.

Each of the two pads 61 of each of the two rear shock-absorbing devices 6 is rested on the lower end of a respective one of the two rear frames 15 and is formed with a through hole 611.

Two of the four knobs 62 of each of the two rear shock-absorbing devices 6 are rested on the two pads 61, and the other two of the four knobs 62 of each of the two rear shock-absorbing devices 6 are rested on the end portion 511 of the wheel seat 51 of a respective one of the two rear connecting devices 5. Each of the four knobs 62 of each of the two rear shock-absorbing devices 6 is formed with a shaft hole 621 for passage of an elongated rod 6211, so that two of the four knobs 62 and the two pads 61 are secured on the respective rear frame 15, and the other two of the four knobs 62 are secured on the end portion 511 of the wheel seat 51 of the respective rear connecting device 5. Each of the four knobs 62 of each of the two rear shock-absorbing devices 6 has a wall formed with a mounting hole 622.

Each of the two inner rods 63 of each of the two rear shock-absorbing devices 6 has two ends each mounted in the mounting hole 622 of a respective one of the four knobs 62 and each formed with an elongated slot 631 aligning with the shaft hole 621 of the respective knob 62 for passage of the elongated rod 6211.

Each of the two elastic members 64 of each of the two rear shock-absorbing devices 6 is mounted on a respective one of the two inner rods 63 and has two ends each mounted in the mounting hole 622 of a respective one of the four knobs 62.

In assembly of each of the two connecting devices 2, referring to FIGS. 1, 3 and 4, the upper end of each of the two front frames 11 is inserted into the insertion hole 211 of the front frame mounting seat 21 of each of the two connecting devices 2, with the two through holes 212 aligning with the two through holes 111 of the respective front frame 11 for passage of the two rivet members "A" which are extended through the two through holes 212 of the front frame mounting seat 21 and the two through holes 111 of the respective front frame 11, so that the front frame mounting seat 21 is fixed on the upper end of the respective front frame 11. Then, the plug 2411 having an annular groove 2412 for securing a first end of each of the two pull cords 2413 is inserted into the receiving hole 241 of the movable block 24 of each of the two connecting devices 2, with each of the two pull cords 2413 being received in the recess 245 of the lug 243 of the movable block 24. Then, the elastic member 244 is mounted on the lug 243 of the movable block 24. Then, the movable block 24 of each of the two connecting devices 2 is mounted in the window 232 of the mounting rod 23, with the elastic member 244 being urged on the lug 234 of the mounting rod 23, and with each of the two pull cords 2413 being extended outward from the rectangular hole 235 of the mounting rod 23. Then, the mounting rod 23 of each of the two connecting devices 2 is mounted in the lower end of a respective one of the two push bars 12, with the two through holes 231 aligning with the two through holes 121 of the lower end of the respective push bar 12, and with the oblong slot 233 aligning with the oblong slot 122 of the respective push bar 12. Then, the fixing seat 25 of each of the two connecting devices 2 is rested on the lower end of a respective one of the two push bars 12, with the two through holes 251 aligning with the two through holes 121 of the lower end of the respective push bar 12 and the two through holes 231 of the mounting rod 23 for passage of the two rivet members "A", thereby combining the fixing seat 25, the lower end of the respective push bar 12 and the mounting rod 23. Then, the push bar mounting seat 22 of each of the two connecting devices 2 is mounted on the upper portion of the front frame mounting seat 21, and each of the two push bars 12 is passed through the receiving space 214 of the front frame mounting seat 21 and the insertion hole 222 of the push bar mounting seat 22, with the oblong slot 122 of the push bar 12 aligning with the through hole 223 of the push bar mounting seat 22 for passage of the rivet member "A", and with the through hole 252 of the fixing seat 25 aligning with the through hole 216 of the front frame mounting seat 21 for passage of the rivet member "A".

In assembly of the operation device 3, referring to FIGS. 1, 5, 6 and 12, the elastic member 345 is mounted in the recess 343 of the lower press board 34, and the threaded post 341 of the lower press board 34 is passed through the mounting hole 314 of the lower cover 31 and is screwed and fixed by the threaded rod 342, so that the elastic member 345 is urged on the receiving chamber 315 of the lower cover 31. Then, the lower cover 31 of the operation device 3 is mounted on the horizontal section 123 of each of the two push bars 12, with the circular hole 3111 of the semi-circular support plate 311 aligning with one of two through holes 1231 of the horizontal section 123 of the respective push bar 12, and with the longer post 3121 of the semi-circular support plate 311 being inserted into the other one of the two through holes 1231 of the horizontal section 123 of the respective push bar 12. Then, the through hole 331 of each of the two driving plates 33 of the operation device 3 is mounted on the shorter post 313 of the lower cover 31. Then, the second end of each of the two pull cords 2413 leaving the respective push bar 12 is secured in the groove 332 of the respective driving plate 33. Then, the pull block 35 of the operation device 3 is mounted in the gate 317 of the lower cover 31. Finally, the upper cover 32 of the operation device 3 is mounted and secured on the lower cover 31 by rivet members "A".

In assembly of the front shock-absorbing device 4, referring to FIGS. 1, 7, 8 and 13, each of the two upper seats 41 of the front shock-absorbing device 4 is secured on the lower end of a respective one of the two front frames 11 by the rivet members "A". Then, a tread board 7 is supported on the concave face 414 and secured by the lug 413 of the support block 411 of each of the two upper seats 41 of the front shock-absorbing device 4. Then, each of the two elastic members 42 of the front shock-absorbing device 4 is mounted on the lower end of a respective one of the two front frames 11, with its upper end being mounted in the concave portion 415 of the ring 416 of the upper seat 41. Then, each of the two shaft seats 43 of the front shock-absorbing device 4 is mounted on the lower end of a respective one of the two front frames 11, and the lower end of each of the two elastic members 42 is mounted in the concave portion 4311 of the ring 431 of the respective shaft seat 43. At this time, each: of the two shaft seats 43 of the front shock-absorbing device 4 has two through holes 432 aligning with the two oblong slots 112 of the lower end each of the two front frames 11 for passage of the two rivet members "A". Then, the elongated opening 434 of the support plate 433 of each of the two shaft seats 43 of the front shock-absorbing device 4 is mounted on the wheel shaft 141 of the front wheel 14 (see FIG. 8). Then, each of the two vertical sections of the support rack 44 of the front shock-absorbing device 4 is mounted in the hollow sleeve 435 of each of the two shaft seats 43, with the two through holes 441 aligning with the two through holes 4351 of the hollow sleeve 435 for passage of the two rivet members "A". Finally, the threaded rod 451 of the caliper brake 45 of the front shock-absorbing device 4 is extended through the through hole 442 of the support rack 44 and screwed and fixed by the nut 454 (see FIG. 8).

In assembly of each of the two rear connecting devices 5, referring to FIGS. 1, 9–11 and 15, the front end of the elbow 52 of each of the two rear connecting devices 5 is received in the lower end of the respective rear frame 15. Then, the elbow 52 of each of the two rear connecting devices 5 is mounted in the lower chamber 512 of the wheel seat 51, with its through hole 521 aligning with the through hole 151 of the lower end of the respective rear frame 15 and the circular hole 513 of the wheel seat 51 for passage of the rivet member "A", so that the wheel seat 51, the front end of the elbow 52 and the lower end of the respective rear frame 15 are combined with each other by the rivet member "A". Then, the locking block 54 and the elastic member 543 of each of the two rear connecting devices 5 are received in the receiving chamber 515 of the wheel seat 51, with the driving plate 541 being slidably mounted on the top wall of the wheel seat 51. Then, the straddle rod 53 is extended through the shaft hole 514 of the wheel seat 51 of each of the two rear connecting devices 5, with the two through holes 532 of the straddle rod 53 aligning with the two circular holes 5141 of the wheel seat 51 and aligning with the two through holes 522 of the elbow 52 of each of the two rear connecting devices 5 for passage of the two rivet members "A", thereby combining and fixing the wheel seat 51, the elbow 52 and the straddle rod 53. Then, the wheel shaft 161 of each of the two rear wheels 16 is inserted into each of the two ends of the straddle rod 53, with the insertion groove 1611 of the wheel shaft 161 aligning with the cutout 531 of each of the two ends of the straddle rod 53, so that the locking rib 544 of the locking block 54 is slidably mounted in the elongated groove 5151 of the wheel seat 51, extended through the cutout 531 of the straddle rod 53 and inserted into the insertion groove 1611 of the wheel shaft 161, thereby preventing detachment of the wheel shaft 161 and the rear wheel 16.

In assembly of each of the two rear shock-absorbing devices 6, again referring to FIGS. 1, 9–11 and 15, each of the two ends of each of the two inner rods 63 and each of the two elastic members 64 is mounted in the mounting hole 622 of a respective one of the knobs 62, with the elongated slot 631 of each of the two ends of each of the two inner rods 63 aligning with the shaft hole 621 of the respective knob 62. Then, the elongated rod 6211 is extended through two knobs 62, two pads 61 and the lower end of a respective one of the two rear frames 15, thereby securing the two knobs 62 and the two pads 61 on the lower end of the respective rear frame 15. Then, another elongated rod 6211 is extended through two knobs 62 and the end portion 511 of the wheel seat 51, thereby securing the two knobs 62 on the end portion 511 of the wheel seat 51.

Figure 14:
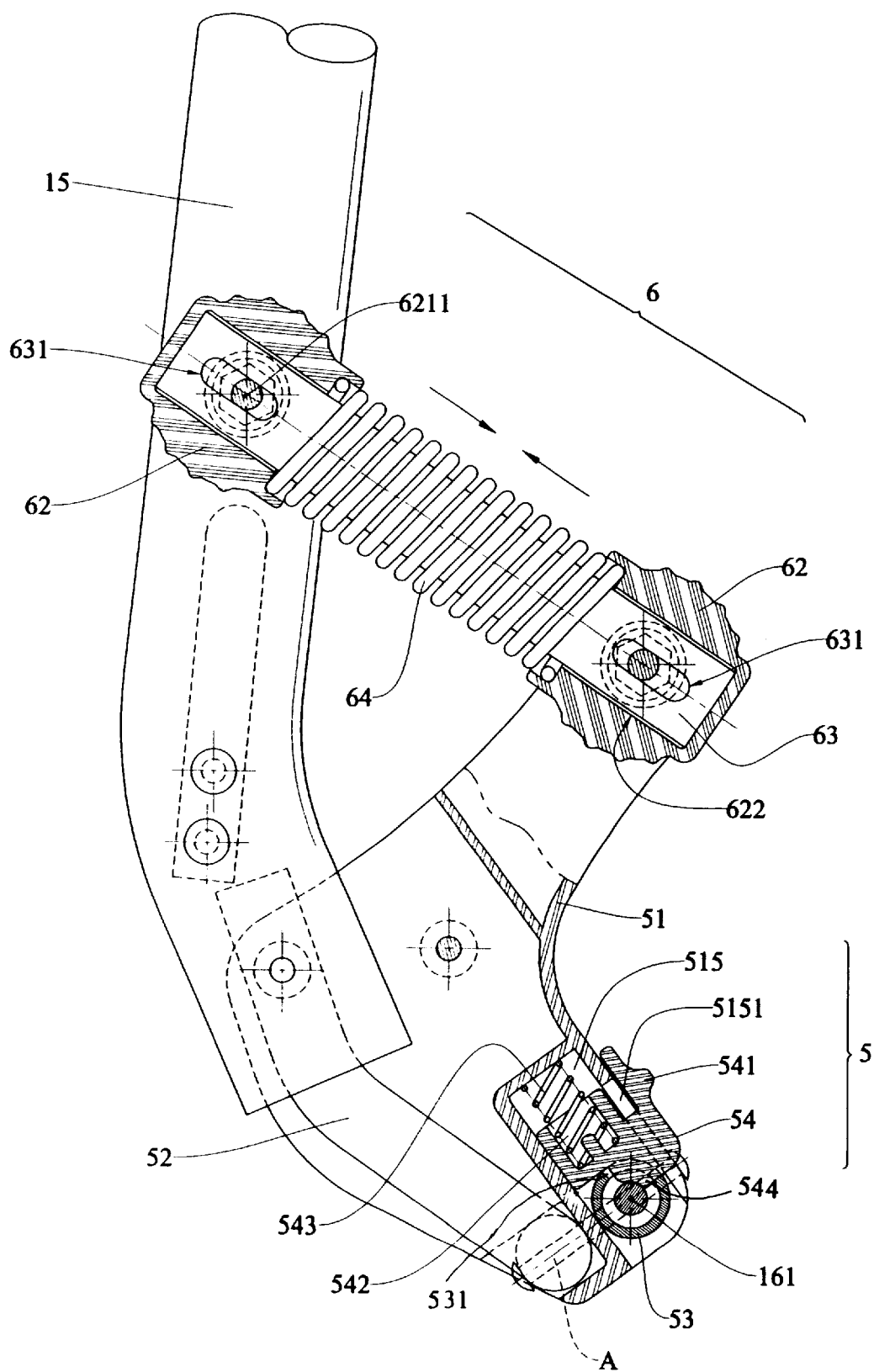
FIG. 14 is a side plan cross-sectional operational view of the rear shock-absorbing device of the foldable three-wheel baby carriage with a shock-absorbing function as shown in FIG. 9.
Figure 15:
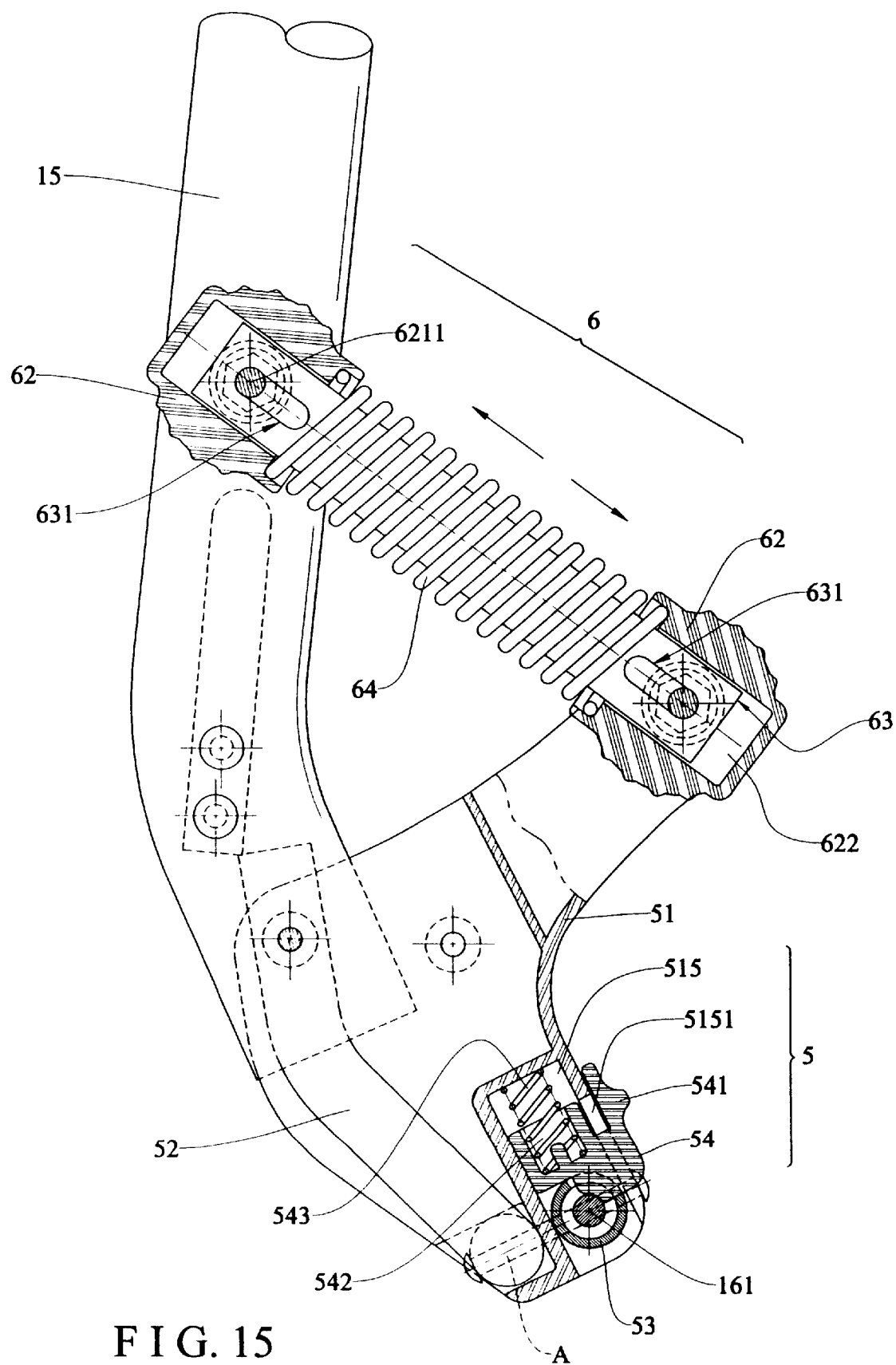
FIG. 15 is a side plan cross-sectional view of the rear shock-absorbing device of the foldable three-wheel baby carriage with a shock-absorbing function as shown in FIG. 9.

In operation, referring to FIGS. 8, 14 and 15, when the foldable three-wheel baby carriage 1 is driven on a rugged road, each of the two shaft seats 43 of the front shock-absorbing device 4 is pressed by lifting of the wheel shaft 141 of the front wheel 14 to compress the elastic member 42, while the wheel seat 51 of each of the two rear connecting devices 5 is pressed by lifting of the wheel shaft 161 of each of the two rear wheels 16 to compress the elastic member 64, so that the shock and vibration applied on the baby carriage 1 may be absorbed and damped by compression of the elastic member 42 and the elastic member 64.

Figure 12:
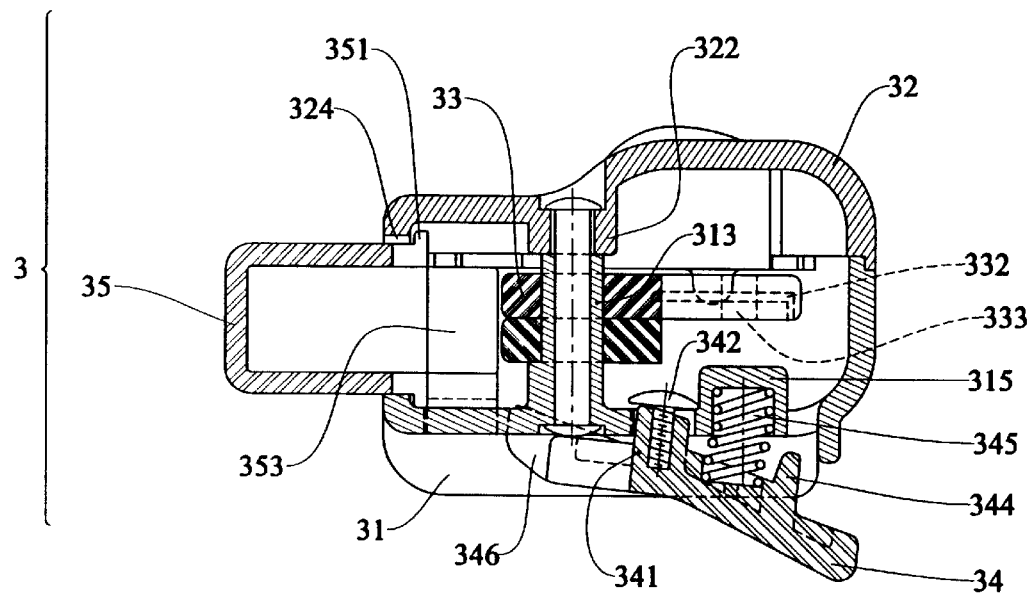
FIG. 12 is a plan cross-sectional view of the operation device of the foldable three-wheel baby carriage with a shock-absorbing function taken along line 12—12 as shown in FIG. 6.
Figure 16:
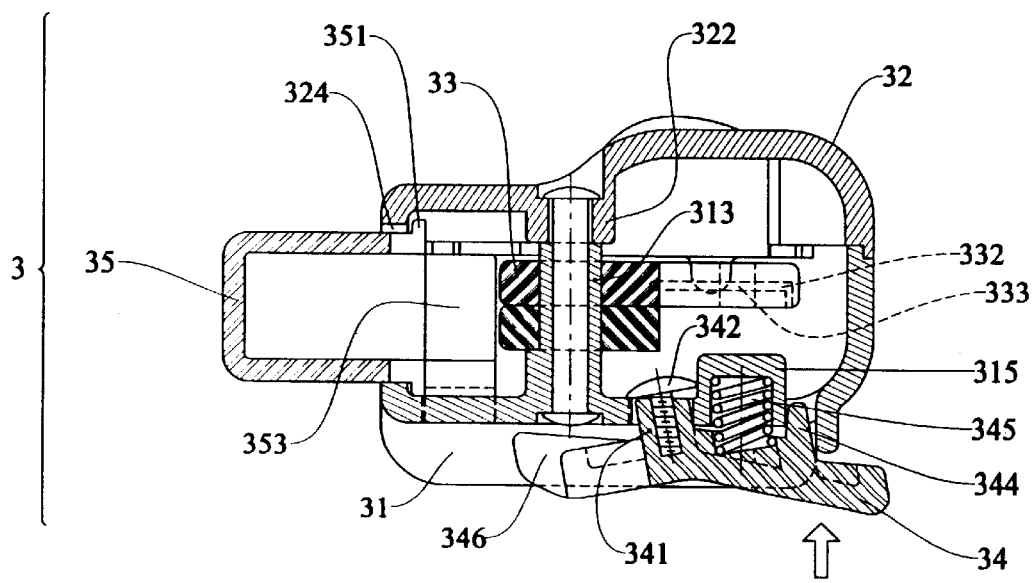
FIG. 16 is an operational view of the operation device of the foldable three-wheel baby carriage with a shock-absorbing function as shown in FIG. 12.
Figure 13:
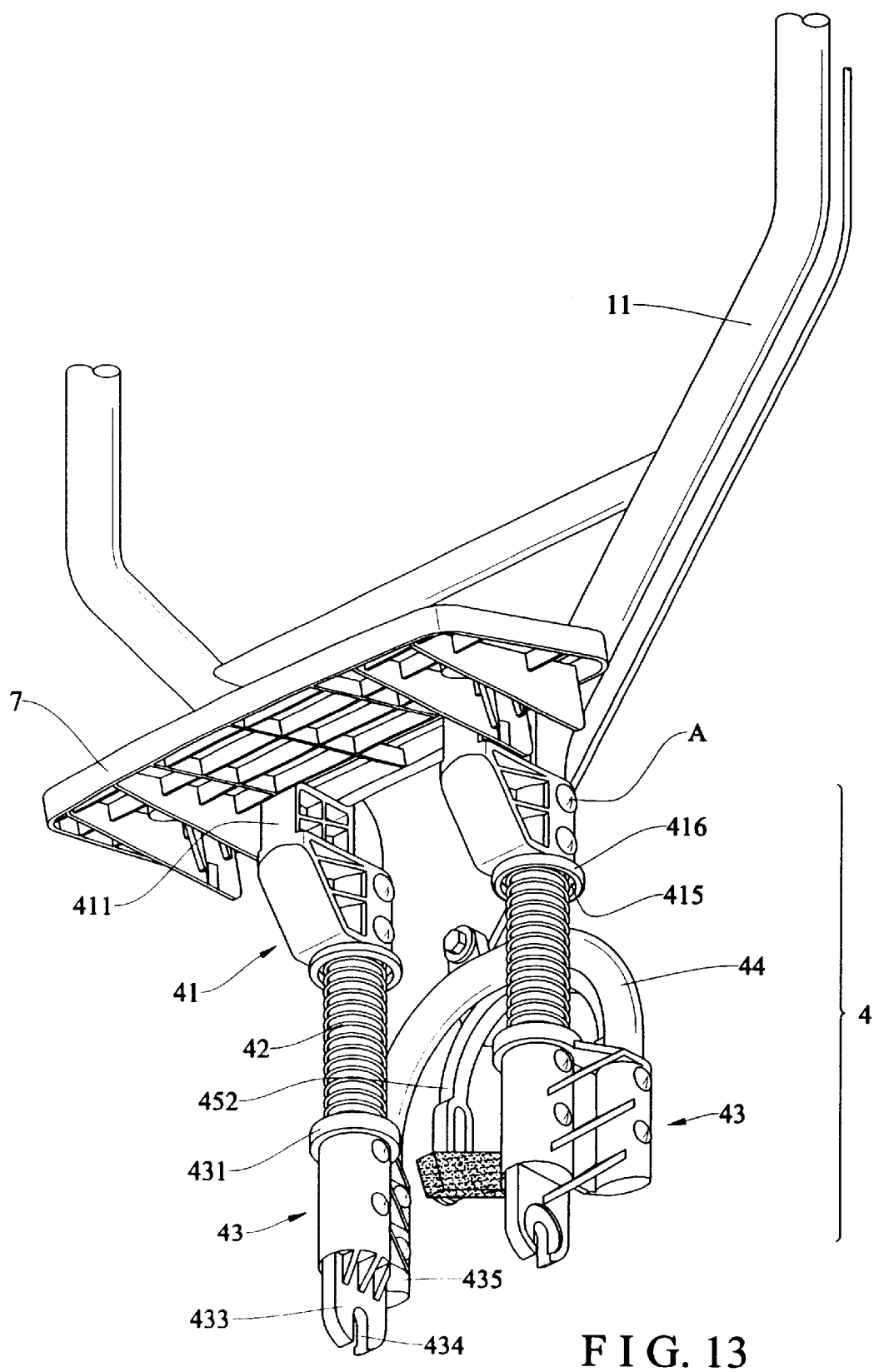
FIG. 13 is a perspective assembly view of the front shock-absorbing device of the foldable three-wheel baby carriage with a shock-absorbing function as shown in FIG. 7.
Figure 17:
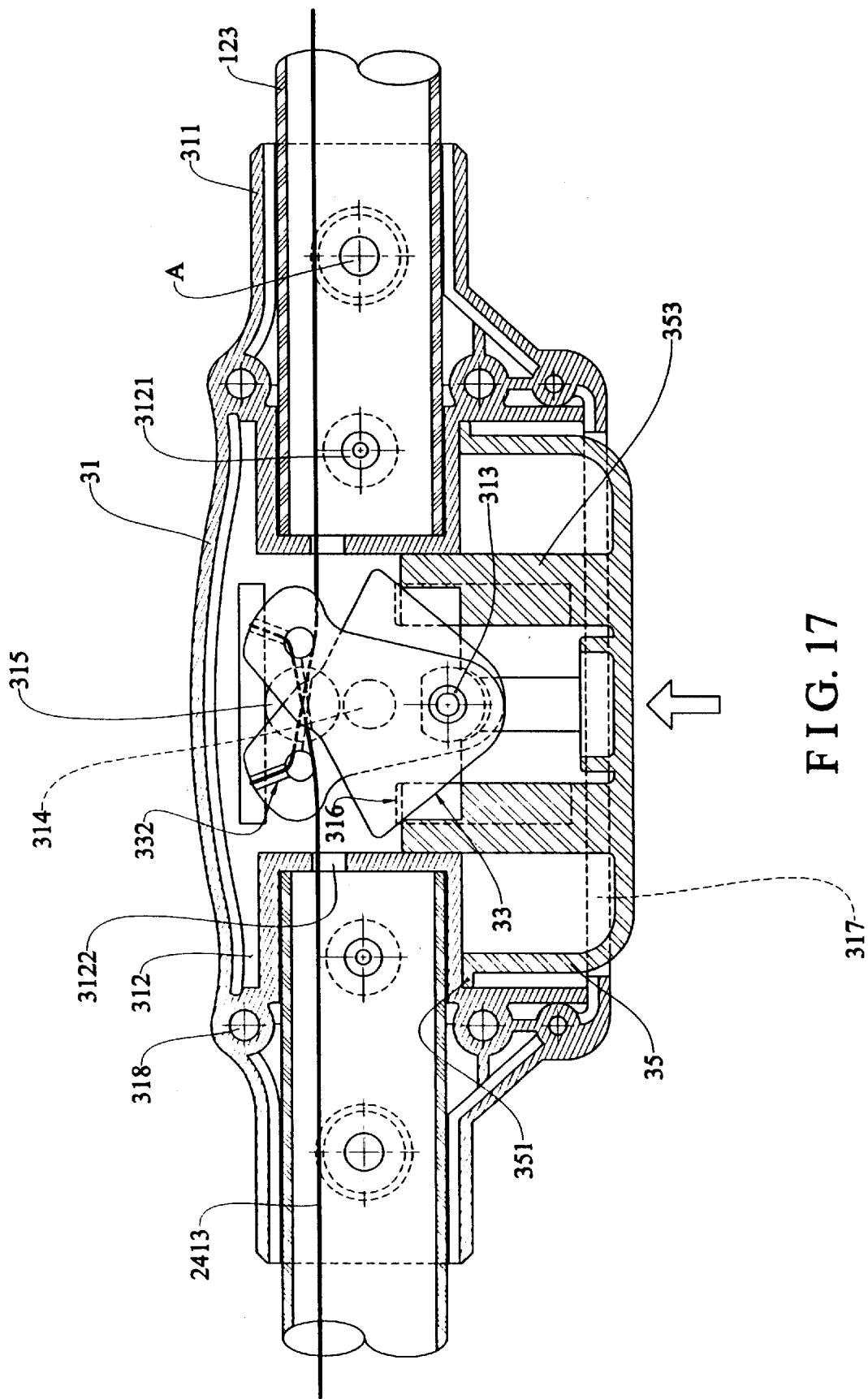
FIG. 17 is an operational view of the operation device of the foldable three-wheel baby carriage with a shock-absorbing function as shown in FIG. 6.
Figure 18:
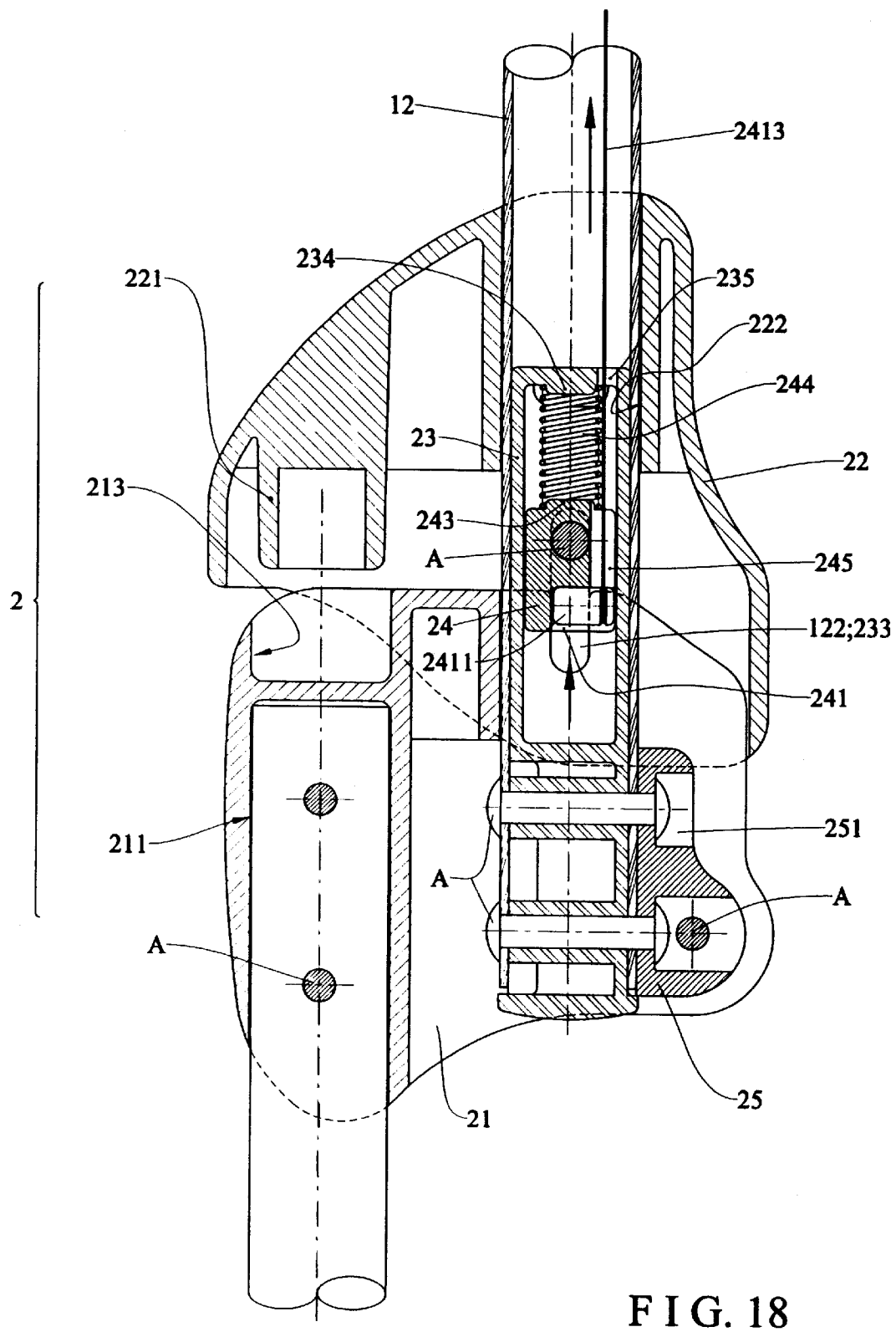
FIG. 18 is an operational view of the connecting device of the foldable three-wheel baby carriage with a shock-absorbing function as shown in FIG. 4.
Figure 19:
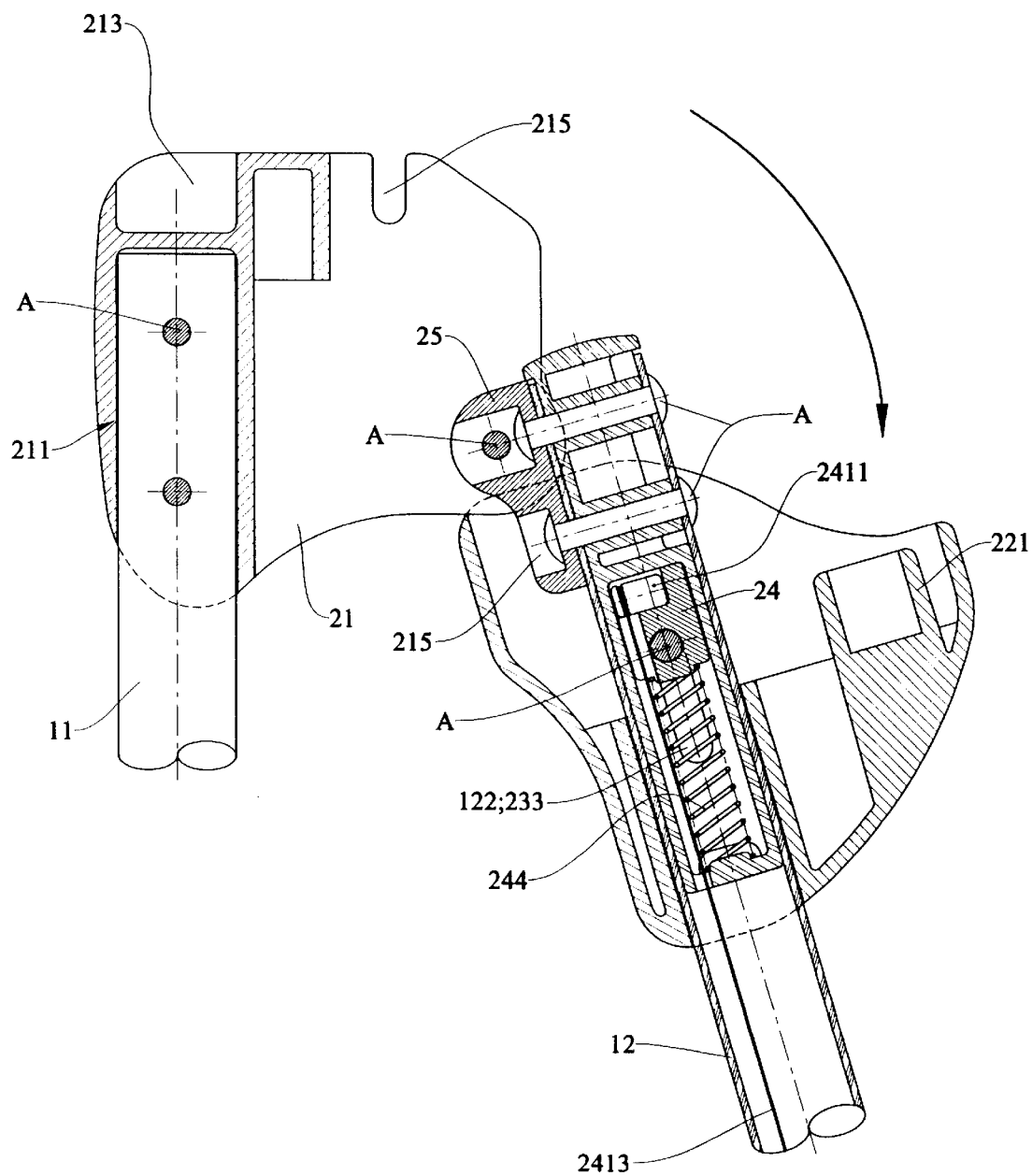
FIG. 19 is an operational view of the connecting device of the foldable three-wheel baby carriage with a shock-absorbing function as shown in FIG. 18.
Figure 21:
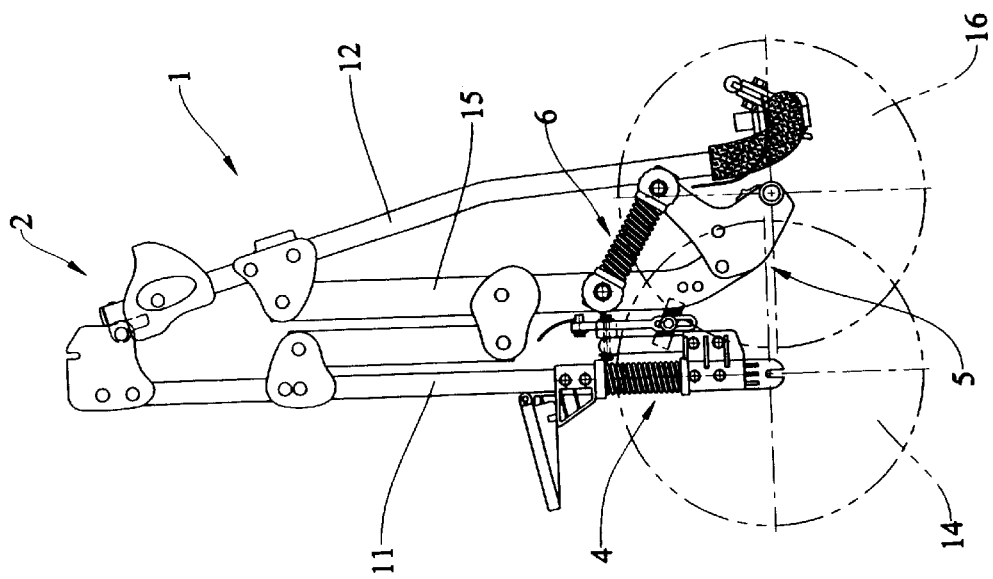
FIG. 21 is an operational view of the foldable three-wheel baby carriage with a shock-absorbing function as shown in FIG. 20.
Figure 20:
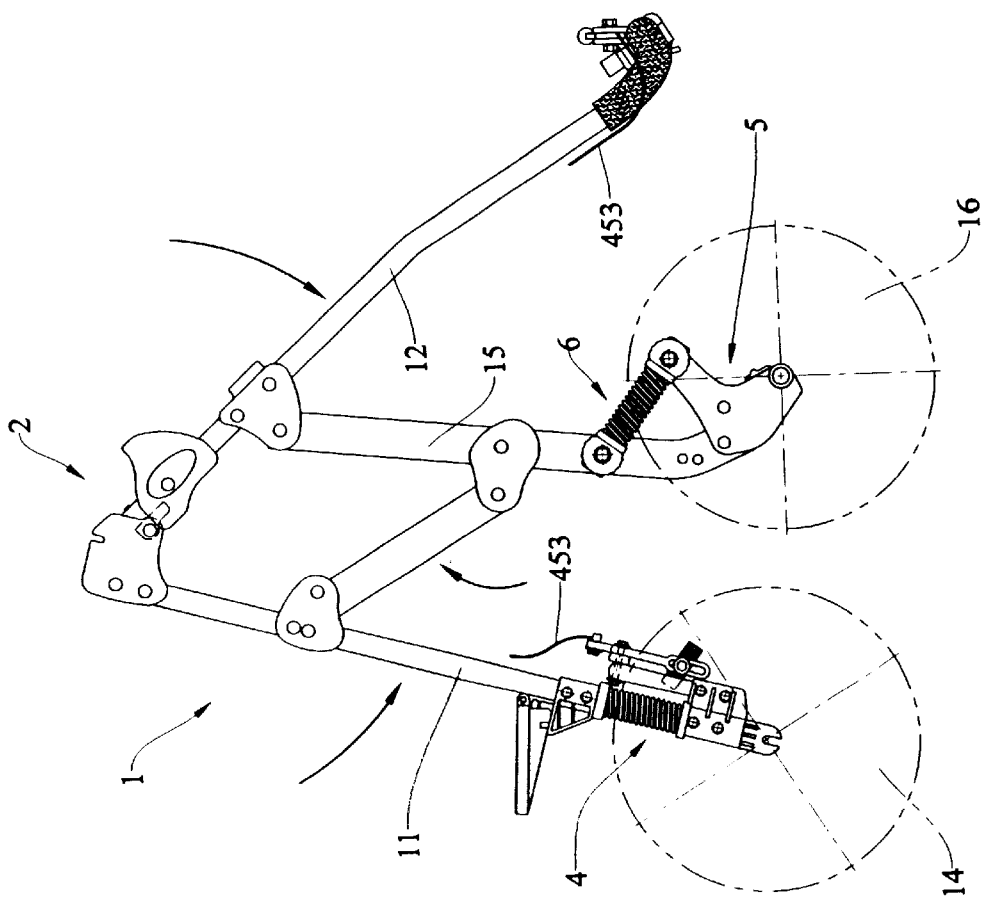
FIG. 20 is an operational view of the foldable three-wheel baby carriage with a shock-absorbing function as shown in FIG. 2.

In folding of the foldable three-wheel baby carriage 1, referring to FIGS. 16–21, the lower press board 34 of the operation device 3 is pressed and moved from the position as shown in FIG. 12 to the position as shown in FIG. 16, to detach the two spaced catch plates 346 of the lower press board 34 from the two rectangular slots 316 of the lower cover 31 and to detach the two push blocks 353 of the pull block 35 from the two spaced catch plates 346 of the lower press board 34, so that the pull block 35 may be pressed inward to move the two push blocks 353 to push the two driving plates 33 which are pivoted in a staggered manner to pull each of the two pull cords 2413 as shown in FIG. 17. Thus, each of the two pull cords 2413 is pulled upward to lift the plug 2411 of each of the two connecting devices 2 to move the movable block 24 upward which moves the push bar mounting seat 22 upward, thereby detaching the insertion post 221 of the push bar mounting seat 22 from the cavity 213 of the front frame mounting seat 21 as shown in FIG. 18, so that each of the two push bars 12 and the push bar mounting seat 22 may be pivoted and moved downward as shown in FIGS. 19 and 20. By pivoting of each of the two push bars 12, the two front frames 11, the two rear frames 15 and the two push bars 12 are pivoted and moved toward each other, thereby folding the baby carriage 1 as shown in FIG. 21.

Accordingly, the foldable three-wheel baby carriage 1 with a shock-absorbing function in accordance with the present invention has the following advantages.

1. The foldable three-wheel baby carriage 1 is provided with a front shock-absorbing device 4 and two rear shock-absorbing devices 6, thereby providing a shock-absorbing function.

2. The foldable three-wheel baby carriage 1 is provided with a brake to provide a braking function, thereby protecting the baby.

3. The connecting devices 2 and the operation device 3 of the foldable three-wheel baby carriage 1 are arranged in hidden manner, thereby enhancing the aesthetic quality of the foldable three-wheel baby carriage 1, and thereby preventing injury of the baby.

Figure 22:
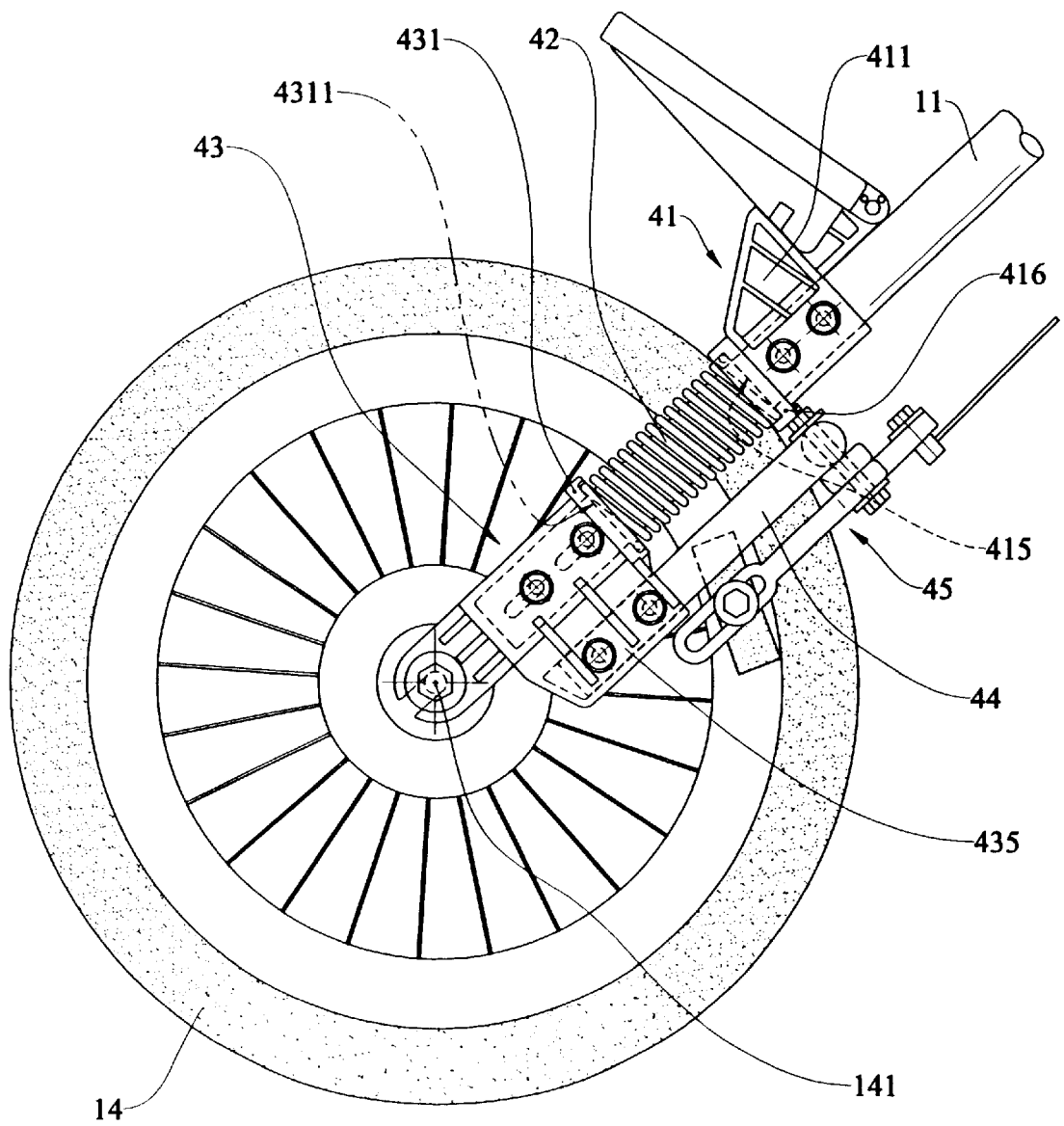
FIG. 22 is an operational view of the front shock-absorbing device of the foldable three-wheel baby carriage with a shock-absorbing function as shown in FIG. 8.

4. The length of each of the two vertical sections of the support rack 44 of the front shock-absorbing device 4 is changed according to the size of the front wheel 14 as shown in FIGS. 8 and 22, thereby enhancing the versatility of the foldable three-wheel baby carriage 1.

5. The locking block 54 may be moved to detach the locking rib 544 from the insertion groove 1611 of the wheel shaft 161 of the respective rear wheel 16, so that the wheel shaft 161 may be detached from the straddle rod 53 easily and quickly, thereby facilitating detachment of the rear wheels 16.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A foldable three-wheel baby carriage with a shock-absorbing function, comprising a front wheel, two front frames, two push bars each having a bent upper end provided with a horizontal section, two rear wheels, two rear frames, two connecting devices each mounted between a respective one of the two front frames and a respective one of the two push bars, an operation device mounted on the horizontal section of each of the two push bars, a front shock-absorbing device mounted between the front wheel and the two front frames, two rear connecting devices each mounted between a respective one of the two rear wheels and a respective one of the two rear frames, and two rear shock-absorbing devices each mounted between a respective one of the two rear wheels and a respective one of the two rear frames, wherein:

each of the two connecting devices includes a front frame mounting seat, a push bar mounting seat, a mounting rod, a movable block, and a mounting rod fixing seat;

the operation device includes a lower cover, an upper cover, two driving plates, a lower press board, and a pull block;

the front shock-absorbing device includes two upper seats, two shaft seats, two elastic members, a support rack, and a caliper brake, wherein:

each of the two upper seats of the front shock-absorbing device is secured on the lower end of a respective one of the two front frames, each of the two upper seats of the front shock-absorbing device has an upper end provided with a support block and a lower end provided with a ring formed with a concave portion, the support block of each of the two upper seats of the front shock-absorbing device has a top provided with a lug formed with a through hole and provided with a concave face;

each of the two shaft seats of the front shock-absorbing device is mounted on the lower end of a respective one of the two front frames, and has a top face provided with a ring formed with a concave portion, each of the two shaft seats of the front shock-absorbing device has a wall formed with two through holes aligning with two oblong slots of the lower end each of the two front frames for passage of two rivet members, each of the two shaft seats of the front shock-absorbing device has a lower end provided with a support plate formed with an elongated opening for mounting the wheel shaft of the front wheel, each of the two shaft seats of the front shock-absorbing device has a rear side integrally formed with a hollow sleeve having a wall formed with two through holes;

each of the two elastic members of the front shock-absorbing device is mounted on the lower end of a respective one of the two front frames, and has an upper end mounted in the concave portion of the ring of the upper seat and a lower end mounted in the concave portion of the ring of the shaft seat;

the support rack of the front shock-absorbing device has two vertical sections each mounted in the hollow sleeve of each of the two shaft seats and each having a wall formed with two through holes aligning with the two through holes of the hollow sleeve for passage of two rivet members, the support rack of the front shock-absorbing device has a horizontal section formed with a through hole; and the caliper brake of the front shock-absorbing device is mounted, on the support rack and is provided with a threaded rod extended through the through hole of the support rack and screwed with a nut, the caliper brake of the front shock-absorbing device is provided with two brake calipers, and a brake cable having a lower end secured on one of the two brake calipers and an upper end extended along the front frame and the push bar and secured on a brake lever mounted on the horizontal section of the push bar;

each of the two rear connecting devices includes a wheel seat, an elbow, a straddle rod, and a locking block; and each of the two rear shock-absorbing devices includes two pads, four knobs, two inner rods, and two elastic members.

2. The foldable three-wheel baby carriage with a shock-absorbing function in accordance with claim 1, wherein:

the front frame mounting seat of each of the two connecting devices has a front side formed with an insertion hole for insertion of a respective one of the two front frames and a cavity located above the insertion hole, the insertion hole of the front frame mounting seat has a wall formed with two through holes aligning with two through holes of the respective front frame for passage of two rivet members which are extended through the two through holes of the front frame mounting seat and the two through holes of the respective front frame, so that the front frame mounting seat is fixed on the respective front frame, the front frame mounting seat has a rear side formed with a receiving space having two side walls each formed with an opening, the rear side of the front frame mounting seat has a lower portion formed with a through hole for passage of a rivet member;

the push bar mounting seat of each of the two connecting devices is mounted on the upper portion of the front frame mounting seat, and has a front side having an inner wall provided with an insertion post inserted into the cavity of the front frame mounting seat, and has a rear side formed with an insertion hole aligning with the receiving space of the front frame mounting seat for insertion of a respective one of the two push bars, the rear side of the push bar mounting seat has a lower portion formed with a through hole for passage of a rivet member;

the mounting rod of each of the two connecting devices is mounted in the lower end of a respective one of the two push bars, and has a lower section formed with two through holes aligning with two through holes of the lower end of the respective push bar, and has an upper section formed with a window having a rear wall formed with an oblong slot aligning with an oblong slot of the respective push bar, the mounting rod of each of the two connecting devices has a top having an inside protruded with a lug for mounting a first end of an elastic member, the lug of the mounting rod has a side formed with a rectangular hole;

the movable block of each of the two connecting devices is mounted in the window of the mounting rod, and has a lower section formed with a receiving hole for receiving a plug which has a periphery formed with, an annular groove for securing a first end of each of two pull cords, the movable block of each of the two connecting devices has an upper section formed with a through hole and has a top protruded with a lug for mounting a second end of the elastic member, the lug of the movable block has a side formed with a recess communicating with the through hole of the movable block;

the fixing seat of each of the two connecting devices is rested on the lower end of a respective one of the two push bars, and has a lower section formed with two through holes aligning with the two through holes of the lower end of the respective push bar and the two through holes of the mounting rod for passage of the two rivet members, the fixing seat of each of the two connecting devices has a lower end formed with a through hole.

3. The foldable three-wheel baby carriage with a shock-absorbing function in accordance with claim 1, wherein:

the lower cover of the operation device has two ends each provided with a semi-circular support plate and a partition for mounting the horizontal section of a respective one of the two push bars, the semi-circular support plate is formed with a circular hole aligning with one of two through holes of the horizontal section of the respective push bar, and the partition is provided with a longer post inserted into the other one of the two through holes of the horizontal section of the respective push bar, the partition has an end face formed with a semi-circular hole, the lower cover of the operation device has a mediate portion provided with a shorter post and formed with a mounting hole and a receiving chamber having an opening facing downward, the mediate portion of the lower cover of the operation device is formed with two rectangular slots with the shorter post being located between the two rectangular slots, the lower cover of the operation device has a front side formed with a gate and having a periphery provided with a plurality of bosses;

the upper cover of the operation device is mounted on the lower cover, and has two ends each provided with a semi-circular support plate, the upper cover of the operation device has a mediate portion provided with a recessed mounting stud for insertion of the shorter post of the lower cover, the mediate portion of the upper cover of the operation device is provided with two limit plates with the mounting stud being located between the two limit plates, the upper cover of the operation device has a front side formed with a gate and having a periphery provided with a plurality of positioning holes for positioning the bosses of the lower cover;

each of the two driving plates of the operation device is pivotally mounted in the lower cover, each of the two driving plates of the operation device has a first portion formed with a through hole for passage of the shorter post of the lower cover and a second portion formed with a through hole and a groove communicating with the through hole of the second portion for securing a second end of each of the two pull cords;

the lower press board of the operation device is mounted on a lower portion of the lower cover, and has a center provided with a threaded post passed through the mounting hole of the lower cover and screwed and fixed by a threaded rod, the lower press board of the operation device is formed with a recess located beside the threaded post for mounting an elastic member which is urged on the receiving chamber of the lower cover, the lower press board of the operation device is provided with an upright plate located beside the recess, the lower press board of the operation device has a front side provided with two spaced catch plates;

the pull block of the operation device is mounted in the gate of the lower cover and the gate of the lower cover, and has a periphery formed with a catch edge and two opposite semi-circular recesses, the pull block of the operation device is provided with two push blocks.

4. The foldable three-wheel baby carriage with a shock-absorbing function in accordance with claim 1, further comprising a plurality of reinforcing ribs mounted between the shaft seat and the hollow sleeve.

5. The foldable three-wheel baby carriage with a shock-absorbing function in accordance with claim 1, wherein:

the wheel seat of each of the two rear connecting devices has a front end formed with an end portion formed with a through hole, the wheel seat of each of the two rear connecting devices has a bottom formed with a lower chamber having two side walls each formed with a circular hole aligning with a through hole formed in the lower end of a respective one of the two rear frames for passage of a rivet member, so that the wheel seat of each of the two rear connecting devices is secured on the lower end of the respective rear frame, the wheel seat of each of the two rear connecting devices has a rear end formed with a shaft hole communicating with the lower chamber and two circular holes each communicating with the shaft hole, the rear-end of the wheel seat of each of the two rear connecting devices has a top face formed with a receiving chamber communicating with the shaft hole, the receiving chamber has a top wall formed with an elongated groove;

the elbow of each of the two rear connecting devices is mounted in the lower chamber of the wheel seat and has a front end received in the lower end of the respective rear frame and formed with a through hole aligning with the through hole of the lower end of the respective rear frame and the circular hole of the wheel seat for passage of the rivet member, so that the wheel seat and the front end of the elbow of each of the two rear connecting devices are combined with the lower end of the respective rear frame, the elbow of each of the two rear connecting devices has a rear end formed with two through holes aligning with the two circular holes of the wheel seat;

the straddle rod is extended through the shaft hole of the wheel seat of each of the two rear connecting devices, and has two ends each formed with two through holes aligning with the two circular holes of the wheel seat and aligning with the two through holes of the elbow of each of the two rear connecting devices for passage of two rivet members, thereby combining the wheel seat, the elbow and the straddle rod, each of the two ends of the straddle rod is formed with a cutout aligning with the elongated groove of the wheel seat of each of the two rear connecting devices and aligning with an insertion groove of the wheel shaft of a respective one of the two rear wheels; and the locking block of each of the two rear connecting devices has an upper portion provided with a driving plate slidably mounted on the wheel seat and a lower portion formed with a chamber for receiving a first end of an elastic member whose second end is received in the receiving chamber of the wheel seat of each of the two rear connecting devices, the lower portion of the locking block of each of the two rear connecting devices is provided with a locking rib slidably mounted in the elongated groove of the wheel seat, extended through the cutout of the straddle rod and inserted into the insertion groove of the wheel shaft of a respective one of the two rear wheels.

6. The foldable three-wheel baby carriage with a shock-absorbing function in accordance with claim 1, wherein:

each of the two pads of each of the two rear shock-absorbing devices is rested on the lower end of a respective one of the two rear frames and is formed with a through hole;

two of the four knobs of each of the two rear shock-absorbing devices are rested on the two pads, and the other two of the four knobs of each of the two rear shock-absorbing devices are rested on the end portion of the wheel seat of a respective one of the two rear connecting devices, each of the four knobs of each of the two rear shock-absorbing devices is formed with a shaft hole for passage of an elongated rod, so that two of the four knobs and the two pads are secured on the respective rear frame, and the other two of the four knobs are secured on the end portion of the wheel seat of the respective rear connecting device, each of the four knobs of each of the two rear shock-absorbing devices has a wall formed with a mounting hole;

each of the two inner rods of each of the two rear shock-absorbing devices has two ends each mounted in the mounting hole of a respective one of the four knobs and each formed with an elongated slot aligning with the shaft hole of the respective knob for passage of the elongated rod; and each of the two elastic members of each of the two rear shock-absorbing devices is mounted on a respective one of the two inner rods and has two ends each mounted in the mounting hole of a respective one of the four knobs.

* * * * *